(12) United States Patent
Pirch et al.

(10) Patent No.: US 11,900,750 B2
(45) Date of Patent: Feb. 13, 2024

(54) ULTRA-WIDE BAND DEVICE FOR ACCESS CONTROL READER SYSTEM

(71) Applicant: ASSA ABLOY AB, Stockholm (SE)

(72) Inventors: Hans-Juergen Pirch, Feldkirchen (AT); Fredrik Carl Stefan Einberg, Huddinge (SE); Tomas Lars Jonsson, Rönninge (SE); Sylvain Jacques Prevost, Austin, TX (US); Jan Steffl, Senomaty (CZ); Hans Gunnar Frank, Spånga (SE)

(73) Assignee: ASSA ABLOY AB, Stockholm (SE)

( * ) Notice: Subject to any disclaimer, the term of this patent is extended or adjusted under 35 U.S.C. 154(b) by 44 days.

(21) Appl. No.: 17/593,180

(22) PCT Filed: Mar. 24, 2020

(86) PCT No.: PCT/EP2020/058201
§ 371 (c)(1),
(2) Date: Sep. 10, 2021

(87) PCT Pub. No.: WO2020/193570
PCT Pub. Date: Oct. 1, 2020

(65) Prior Publication Data
US 2022/0189224 A1 Jun. 16, 2022

Related U.S. Application Data

(60) Provisional application No. 62/906,995, filed on Sep. 27, 2019, provisional application No. 62/823,341, filed on Mar. 25, 2019.

(51) Int. Cl.
*G07C 9/29* (2020.01)
*H01Q 5/25* (2015.01)
(Continued)

(52) U.S. Cl.
CPC .......... *G07C 9/29* (2020.01); *G06K 7/10297* (2013.01); *G06K 7/10366* (2013.01);
(Continued)

(58) Field of Classification Search
CPC .. G07C 9/29; G07C 9/00182; G07C 9/00309; G07C 2209/61; G07C 2209/63;
(Continued)

(56) References Cited

U.S. PATENT DOCUMENTS 7,446,644 B2 * 11/2008 Schaffzin ........... G07C 9/00182
340/686.2
7,499,674 B2 3/2009 Salokannel et al.
(Continued)

FOREIGN PATENT DOCUMENTS

AU 2018389642 A1 5/2020
AU 2020249420 B2 1/2023
(Continued)

OTHER PUBLICATIONS

U.S. Appl. No. 17/309,102, filed Apr. 23, 2021, Systems, Methods, and Devices for Access Control.
(Continued)

*Primary Examiner* — Nam V Nguyen
(74) *Attorney, Agent, or Firm* — Schwegman Lundberg & Woessner, P.A.

(57) ABSTRACT

A device connectable to a reader of an access control system includes an antenna, an ultra-wide band (UWB) front end circuit, a controller, and a communication link. The (UWB) front end circuit is connected to the antenna to facilitate UWB communication with a credential device. The controller is connected to the UWB front end and configured to perform ranging for the credential device using the UWB communication. The communication link is configured to interface with the reader.

20 Claims, 11 Drawing Sheets

(51) Int. Cl.
  *H04W 4/80* (2018.01)
  *G06K 7/10* (2006.01)
  *G07C 9/00* (2020.01)
  *H04B 1/69* (2011.01)

(52) U.S. Cl.
  CPC ..... *G07C 9/00182* (2013.01); *G07C 9/00309* (2013.01); *H01Q 5/25* (2015.01); *H04W 4/80* (2018.02); *H04B 1/69* (2013.01)

(58) Field of Classification Search
  CPC .................. G07C 9/28; G07C 9/00174; G07C 2009/00642; G07C 2009/00769; G06K 7/10297; G06K 7/10366; G06K 17/0029; H01Q 5/25; H04W 4/80; H04W 12/06; H04B 1/69; G01S 13/765
  USPC ........................................................ 340/5.61
  See application file for complete search history.

(56) References Cited

U.S. PATENT DOCUMENTS

| | | | |
|---|---|---|---|
| 7,597,250 B2 | 10/2009 | Finn | |
| 7,756,002 B2 | 7/2010 | Batra et al. | |
| 7,881,746 B2 | 2/2011 | Desai | |
| 7,995,644 B2 | 8/2011 | Sahinoglu et al. | |
| 8,001,055 B2 | 8/2011 | Weiss | |
| 8,355,671 B2 | 1/2013 | Kramer et al. | |
| 8,430,310 B1* | 4/2013 | Ho | G06F 21/35 235/382 |
| 8,478,360 B2 | 7/2013 | Soliman | |
| 8,736,438 B1 | 5/2014 | Vasquez et al. | |
| 8,913,599 B2 | 12/2014 | Gonikberg et al. | |
| 9,007,173 B2 | 4/2015 | Mcintyre et al. | |
| 9,058,702 B2* | 6/2015 | Chao | H04W 4/029 |
| 9,357,381 B2 | 5/2016 | Cho et al. | |
| 9,367,978 B2* | 6/2016 | Sullivan | G07C 9/00571 |
| 9,408,147 B2 | 8/2016 | Polo et al. | |
| 9,485,607 B2* | 11/2016 | Aarnio | H04W 4/80 |
| 9,501,884 B2 | 11/2016 | Mcintyre et al. | |
| 9,530,265 B2 | 12/2016 | Lee et al. | |
| 9,666,005 B2 | 5/2017 | Ellis et al. | |
| 9,721,404 B2 | 8/2017 | Muller | |
| 9,769,627 B2 | 9/2017 | Siswick et al. | |
| 9,830,443 B2* | 11/2017 | Mutz | G06F 21/305 |
| 9,942,849 B1 | 4/2018 | Hariharan et al. | |
| 10,117,046 B2 | 10/2018 | Ledvina et al. | |
| 10,152,837 B1 | 12/2018 | Mallard | |
| 10,171,129 B1 | 1/2019 | Hammerschmidt et al. | |
| 10,182,309 B2* | 1/2019 | Mahasenan | G01C 21/08 |
| 10,228,444 B2* | 3/2019 | Jonsson | G01S 3/50 |
| 10,229,548 B2* | 3/2019 | Daniel-Wayman | G07C 9/23 |
| 10,235,854 B2* | 3/2019 | Trani | H04W 4/021 |
| 10,356,553 B2 | 7/2019 | Sant et al. | |
| 10,486,646 B2 | 11/2019 | Ledvina et al. | |
| 10,567,034 B2 | 2/2020 | Hammerschmidt et al. | |
| 10,602,556 B2 | 3/2020 | Foster et al. | |
| 10,652,925 B2 | 5/2020 | Naguib et al. | |
| 10,660,037 B2 | 5/2020 | Hariharan et al. | |
| 10,728,244 B2* | 7/2020 | Trani | H04L 67/00 |
| 10,759,389 B2 | 9/2020 | Ledvina et al. | |
| 10,819,029 B2 | 10/2020 | Amiri et al. | |
| 11,100,734 B2* | 8/2021 | Ahn | G07C 9/00309 |
| 11,164,411 B2* | 11/2021 | Kuenzi | G07C 9/00904 |
| 11,237,243 B2* | 2/2022 | Jonsson | G01S 3/46 |
| 11,295,563 B2* | 4/2022 | Kuenzi | G07C 9/00309 |
| 11,405,784 B2* | 8/2022 | Pirch | G07C 9/00904 |
| 11,770,708 B2 | 9/2023 | Pirch et al. | |
| 2003/0204742 A1 | 10/2003 | Gupta et al. | |
| 2003/0232620 A1 | 12/2003 | Runkle et al. | |
| 2004/0250074 A1 | 12/2004 | Kilian-Kehr | |
| 2007/0149123 A1 | 6/2007 | Palin | |
| 2007/0149124 A1 | 6/2007 | Onozawa | |
| 2007/0288995 A1 | 12/2007 | Terada et al. | |
| 2010/0034375 A1 | 2/2010 | Davis et al. | |
| 2011/0187493 A1 | 8/2011 | Elfstroem et al. | |
| 2012/0266221 A1 | 10/2012 | Castelluccia et al. | |
| 2013/0217332 A1 | 8/2013 | Altman et al. | |
| 2013/0225080 A1 | 8/2013 | Doss et al. | |
| 2013/0237148 A1* | 9/2013 | McCann | H04W 48/10 455/41.1 |
| 2013/0287211 A1 | 10/2013 | Rhelimi | |
| 2014/0070003 A1 | 3/2014 | Radicella | |
| 2014/0229385 A1 | 8/2014 | Neafsey | |
| 2014/0298398 A1 | 10/2014 | Neely | |
| 2014/0342667 A1 | 11/2014 | Aarnio | |
| 2014/0355582 A1 | 12/2014 | Kamath et al. | |
| 2015/0029010 A1 | 1/2015 | Wisnia | |
| 2015/0200706 A1 | 7/2015 | Bottazzi et al. | |
| 2015/0200925 A1 | 7/2015 | Lagerstedt et al. | |
| 2015/0310681 A1 | 10/2015 | Avery et al. | |
| 2015/0332532 A1 | 11/2015 | Lee et al. | |
| 2016/0055692 A1 | 2/2016 | Trani | |
| 2016/0086406 A1 | 3/2016 | Baumgarte | |
| 2016/0147988 A1 | 5/2016 | Mutz et al. | |
| 2016/0234008 A1 | 8/2016 | Hekstra et al. | |
| 2016/0241559 A1 | 8/2016 | Trani et al. | |
| 2016/0241999 A1 | 8/2016 | Chin et al. | |
| 2016/0248782 A1 | 8/2016 | Troesch | |
| 2016/0267760 A1 | 9/2016 | Trani | |
| 2016/0278006 A1 | 9/2016 | Lee et al. | |
| 2016/0316500 A1 | 10/2016 | Aliyar | |
| 2016/0353233 A1* | 12/2016 | Yong | H04L 67/51 |
| 2016/0358394 A1 | 12/2016 | Konicek et al. | |
| 2016/0360341 A1 | 12/2016 | Srivatsa et al. | |
| 2017/0004665 A1 | 1/2017 | Chang et al. | |
| 2017/0019765 A1 | 1/2017 | Hoyer et al. | |
| 2017/0053467 A1 | 2/2017 | Meganck et al. | |
| 2017/0070919 A1 | 3/2017 | Verger et al. | |
| 2017/0074000 A1 | 3/2017 | Banvait | |
| 2017/0151918 A1 | 6/2017 | Boesen | |
| 2017/0153636 A1 | 6/2017 | Boesen | |
| 2017/0158202 A1 | 6/2017 | Yang | |
| 2017/0228953 A1* | 8/2017 | Lupovici | G07C 9/00896 |
| 2017/0232930 A1 | 8/2017 | Murar et al. | |
| 2017/0236346 A1 | 8/2017 | Murar et al. | |
| 2017/0236351 A1 | 8/2017 | Menard et al. | |
| 2017/0301166 A1 | 10/2017 | Earles et al. | |
| 2017/0303084 A1 | 10/2017 | Brückner | |
| 2017/0330226 A1 | 11/2017 | Kuenzi et al. | |
| 2017/0359689 A1 | 12/2017 | Chhabra et al. | |
| 2018/0081025 A1 | 3/2018 | Jonsson et al. | |
| 2018/0144563 A1 | 5/2018 | Reymann | |
| 2018/0162321 A1 | 6/2018 | Spiess | |
| 2018/0225898 A1 | 8/2018 | Kirkland et al. | |
| 2018/0234797 A1 | 8/2018 | Ledvina et al. | |
| 2018/0310159 A1 | 10/2018 | Katz et al. | |
| 2018/0315262 A1* | 11/2018 | Love | G07C 9/00309 |
| 2019/0051072 A1 | 2/2019 | Okada | |
| 2019/0052314 A1 | 2/2019 | Caruana | |
| 2019/0061686 A1 | 2/2019 | Neuhoff et al. | |
| 2019/0073846 A1 | 3/2019 | Kamkar et al. | |
| 2019/0097317 A1 | 3/2019 | Di Nallo et al. | |
| 2019/0098499 A1 | 3/2019 | Lerch et al. | |
| 2019/0116619 A1 | 4/2019 | Hauck et al. | |
| 2019/0135229 A1 | 5/2019 | Ledvina et al. | |
| 2019/0266822 A1* | 8/2019 | Ruggieri | G07C 9/00 |
| 2020/0053689 A1 | 2/2020 | Mcqueen et al. | |
| 2020/0106877 A1 | 4/2020 | Ledvina et al. | |
| 2020/0150261 A1 | 5/2020 | Naguib et al. | |
| 2020/0168017 A1 | 5/2020 | Prostko et al. | |
| 2020/0238952 A1 | 7/2020 | Lindsay et al. | |
| 2020/0259522 A1 | 8/2020 | Hammerschmidt et al. | |
| 2020/0259896 A1 | 8/2020 | Sachs et al. | |
| 2020/0314651 A1 | 10/2020 | Pirch et al. | |
| 2020/0320188 A1 | 10/2020 | Graff et al. | |
| 2020/0349785 A1 | 11/2020 | Kuenzi et al. | |
| 2020/0351781 A1 | 11/2020 | Hariharan et al. | |
| 2021/0142600 A1 | 5/2021 | Tiwari et al. | |
| 2021/0352608 A1 | 11/2021 | Chun et al. | |
| 2021/0383624 A1 | 12/2021 | Hoyer et al. | |
| 2022/0157106 A1 | 5/2022 | Pirch et al. | |
| 2022/0172529 A1 | 6/2022 | Pirch et al. | |
| 2022/0172536 A1 | 6/2022 | Pirch et al. | |

(56) References Cited

U.S. PATENT DOCUMENTS

| | | | | |
|---|---|---|---|---|
| 2022/0189224 | A1* | 6/2022 | Pirch | H04W 4/80 |
| 2022/0189228 | A1 | 6/2022 | Pirch et al. | |
| 2022/0189229 | A1 | 6/2022 | Pirch et al. | |
| 2022/0191700 | A1 | 6/2022 | Jung et al. | |
| 2022/0377555 | A1 | 11/2022 | Pirch et al. | |

FOREIGN PATENT DOCUMENTS

| | | |
|---|---|---|
| AU | 2020249424 | 3/2023 |
| AU | 2020249425 A1 | 3/2023 |
| AU | 2019373730 | 4/2023 |
| AU | 2020247109 | 6/2023 |
| AU | 2020247388 | 6/2023 |
| AU | 2020247386 | 7/2023 |
| CN | 101133343 | 2/2008 |
| CN | 102150448 | 8/2011 |
| CN | 202703516 U | 1/2013 |
| CN | 103544746 | 1/2014 |
| CN | 104063930 A | 9/2014 |
| CN | 104620552 | 5/2015 |
| CN | 104661308 A | 5/2015 |
| CN | 105723043 A | 6/2016 |
| CN | 105931326 A | 9/2016 |
| CN | 107206966 A | 9/2017 |
| CN | 107730663 A | 2/2018 |
| CN | 108475447 | 8/2018 |
| CN | 108701177 | 10/2018 |
| CN | 108701382 A | 10/2018 |
| CN | 108778855 A | 11/2018 |
| CN | 109074618 A | 12/2018 |
| CN | 109076487 A | 12/2018 |
| CN | 111738377 A | 10/2020 |
| CN | 111738378 A | 10/2020 |
| CN | 113039823 | 6/2021 |
| CN | 113614559 | 11/2021 |
| CN | 113614797 | 11/2021 |
| CN | 113614798 | 11/2021 |
| CN | 113631947 | 11/2021 |
| CN | 113678014 | 11/2021 |
| CN | 116071857 | 5/2023 |
| CN | 113614798 | 8/2023 |
| DE | 102017110144 | 10/2018 |
| EP | 2355050 A2 | 8/2011 |
| EP | 2706720 A1 | 3/2014 |
| EP | 2617242 B1 | 10/2016 |
| EP | 3101874 A1 | 12/2016 |
| EP | 3118820 | 1/2017 |
| EP | 3355281 A1 | 8/2018 |
| EP | 3376475 A1 | 9/2018 |
| EP | 3928111 A1 | 12/2021 |
| IN | 202117041715 | 12/2021 |
| IN | 202117042210 | 12/2021 |
| IN | 202117019181 | 1/2022 |
| IN | 202117041276 | 8/2022 |
| IN | 202117041409 A | 9/2022 |
| IN | 202117041414 A | 9/2022 |
| IN | 202117041712 A | 9/2022 |
| IN | 202117041714 A | 9/2022 |
| JP | H02186082 A | 7/1990 |
| JP | 2002334361 | 11/2002 |
| JP | 2005320742 | 11/2005 |
| JP | 2007066107 | 3/2007 |
| JP | 2007102405 A | 4/2007 |
| JP | 2007316980 | 12/2007 |
| JP | 2008205548 A | 9/2008 |
| JP | 2009075010 A | 4/2009 |
| JP | 2009127284 A | 6/2009 |
| JP | 2010079609 | 4/2010 |
| JP | 2010126898 | 6/2010 |
| JP | 2010226246 | 10/2010 |
| JP | 2010277557 A | 12/2010 |
| JP | 2012511761 A | 5/2012 |
| JP | 2015090583 | 5/2015 |
| JP | 2015106266 A | 6/2015 |
| JP | 2015227594 | 12/2015 |
| JP | 2016094801 | 5/2016 |
| JP | 2017029701 | 2/2017 |
| JP | 6205237 B2 | 9/2017 |
| JP | 2017538875 A | 12/2017 |
| JP | 6419202 B2 | 10/2018 |
| JP | 2018178506 | 11/2018 |
| JP | 2018206355 A | 12/2018 |
| JP | 2018537017 | 12/2018 |
| JP | 2019528387 A | 10/2019 |
| JP | 2020510567 A | 4/2020 |
| JP | 2022506040 | 1/2022 |
| JP | 2022526155 | 5/2022 |
| JP | 2022526335 | 5/2022 |
| JP | 2022526336 | 5/2022 |
| JP | 2022526337 | 5/2022 |
| JP | 2022527064 | 5/2022 |
| JP | 2022527065 | 5/2022 |
| JP | 2022528637 | 6/2022 |
| JP | 7213967 B2 | 1/2023 |
| JP | 7225431 B2 | 2/2023 |
| JP | 7228056 B2 | 2/2023 |
| JP | 7241909 B2 | 3/2023 |
| JP | 2023054074 A | 4/2023 |
| JP | 2023071643 | 5/2023 |
| JP | 2023071680 | 5/2023 |
| JP | 2023080067 | 6/2023 |
| KR | 101077406 B1 | 10/2011 |
| KR | 20170040240 A | 4/2017 |
| KR | 20170140367 | 12/2017 |
| KR | 20180087429 | 8/2018 |
| KR | 20190023713 A | 3/2019 |
| MX | PA03010049 | 12/2004 |
| MX | 2021011587 | 7/2023 |
| WO | WO-2013178163 A1 | 12/2013 |
| WO | WO-2014016695 A2 | 1/2014 |
| WO | WO-2016007627 A1 | 1/2016 |
| WO | WO-2016059451 A1 | 4/2016 |
| WO | WO-2016089837 A1 | 6/2016 |
| WO | 2017058925 | 4/2017 |
| WO | WO-2017136725 A1 | 8/2017 |
| WO | WO-2017144345 A1 | 8/2017 |
| WO | WO-2017181132 A2 | 10/2017 |
| WO | WO-2018071671 A2 | 4/2018 |
| WO | 2018091660 | 5/2018 |
| WO | WO-2018148687 A1 | 8/2018 |
| WO | WO-2019016599 A1 | 1/2019 |
| WO | Wo-2019224329 A1 | 11/2019 |
| WO | 2020089484 | 5/2020 |
| WO | WO-2020193566 A1 | 10/2020 |
| WO | WO-2020193568 A1 | 10/2020 |
| WO | WO-2020193570 A1 | 10/2020 |
| WO | WO-2020193576 A1 | 10/2020 |
| WO | WO-2020193577 A1 | 10/2020 |
| WO | WO-2020193578 A1 | 10/2020 |
| WO | WO-2020193580 A1 | 10/2020 |

OTHER PUBLICATIONS

U.S. Appl. No. 16/828,001, filed Mar. 24, 2020, Physical Access Control Systems With Localization-Based Intent Detection.
U.S. Appl. No. 17/593,174, filed Sep. 10, 2021, Ultra-Wide Band Device for Access Control Reader System.
U.S. Appl. No. 17/593,336, filed Sep. 15, 2021, Reader Coordination for Access Control.
U.S. Appl. No. 17/593,338, filed Sep. 15, 2021, Physical Access Control Systems With Localization-Based Intent Detection.
U.S. Appl. No. 17/593,340, filed Sep. 15, 2021, Physical Access Control Systems With Localization-Based Intent Detection.
U.S. Appl. No. 17/593,342, filed Sep. 15, 2021, Physical Access Control Systems With Localization- Based Intent Detection.
"International Application Serial No. PCT/EP2019/080113, International Search Report dated Feb. 7, 2020", 4 pgs.
"International Application Serial No. PCT/EP2019/080113, Written Opinion dated Feb. 7, 2020", 5 pgs.
"U.S. Appl. No. 17/309,102, Preliminary Amendment Filed Apr. 23, 2021", 8 pgs.

(56) References Cited

OTHER PUBLICATIONS

"International Application Serial No. PCT/EP2019/080113, International Preliminary Report on Patentability dated May 14, 2021", 7 pgs.
"U.S. Appl. No. 17/593,174 Preliminary Amendment filed Sep. 10, 2021", 7 pgs.
"U.S. Appl. No. 17/593,336 Preliminary Amendment filed Sep. 15, 2021", 8 pgs.
"U.S. Appl. No. 17/593,338 Preliminary Amendment filed Sep. 15, 2021", 6 pgs.
"U.S. Appl. No. 17/593,340 Preliminary Amendment filed Sep. 15, 2021", 7 pgs.
"International Application Serial No. PCT/EP2020/058210, International Preliminary Report on Patentability dated Oct. 7, 2021", 15 pgs.
"International Application Serial No. PCT/EP2020/058197, International Preliminary Report on Patentability dated Oct. 7, 2021", 10 pgs.
"International Application Serial No. PCT/EP2020/058201, International Preliminary Report on Patentability dated Oct. 7, 2021", 10 pgs.
"International Application Serial No. PCT/EP2020/058221, International Preliminary Report on Patentability dated Oct. 7, 2021", 12 pgs.
"International Application Serial No. PCT/EP2020/058199, International Preliminary Report on Patentability dated Sep. 28, 2021", 8 pgs.
"International Application Serial No. PCT/EP2020/058216, International Preliminary Report on Patentability dated Sep. 28, 2021", 9 pgs.
"International Application Serial No. PCT/EP2020/058218, International Preliminary Report on Patentability dated Sep. 28, 2021", 7 pgs.
"U.S. Appl. No. 16/828,001, Non Final Office Action dated Feb. 17, 2022", 10 pgs.
"Indian Application Serial No. 202117041715, First Examination Report dated Mar. 15, 2022", w/ English Translation, 8 pgs.
"Indian Application Serial No. 202117042210, First Examination Report dated Mar. 17, 022", w/ English Translation, 5 pgs.
"European Application Serial No. 20714984.0, Response filed Mar. 30, 2022 Communication Pursuant to Rules 161(1) and 162 EPC dated Sep. 30, 2021", 40 pgs.
"European Application Serial No. 20714986.5, Response filed Apr. 12, 2022 Communication Pursuant to Rule 161(1) and 162 EPC dated Oct. 5, 2021", 30 pgs.
"European Application Serial No. 20714545.9, Response filed Apr. 12, 2022 to Communication Pursuant to Rule 161(1) and 162 EPC dated Oct. 5, 2021", 77 pgs.
"European Application Serial No. 20714987.3, Response filed Apr. 12, 2022 to Communication Pursuant to Rules 161(1) and 162 EPC dated Oct. 5, 2021", 78 pgs.
"European Application Serial No. 20714985.7, Response filed Apr. 12, 2022 to Communication Pursuant to Rules 161(1) and 162 EPC dated Oct. 5, 2021", 18 pgs.
"European Application Serial No. 20714988.1, Response Filed Apr. 11, 2022 to Communication pursuant to Rules 161(1) and 162 EPC Filed Oct. 5, 2021", 20 pgs.
"U.S. Appl. No. 16/828,001, Response filed May 16, 2022 to Non Final Office Action dated Feb. 17, 2022", 13 pgs.
"Google: core/java/android/companion/BluetoothLeDeviceFilter. java—platform/frameworks/base—Git at Google", Android Core Code, Bluetooth Companion, [Online] Retrieved from the Internet: <https://android.googlesource.com/platform/frameworks/base/+/master/core/java/android/companion/BluetoothLeDeviceFilter. java>, (Jan. 1, 2017), 9 pgs.
"International Application Serial No. PCT/EP2020/058197, International Search Report dated Jul. 28, 2020", 5 pgs.
"International Application Serial No. PCT/EP2020/058197, Written Opinion dated Jul. 28, 2020", 8 pgs.
"International Application Serial No. PCT/EP2020/058199, International Search Report dated Jun. 8, 2020", 5 pgs.
"International Application Serial No. PCT/EP2020/058199, Written Opinion dated Jun. 8, 2020", 7 pgs.
"International Application Serial No. PCT/EP2020/058201, International Search Report dated Jun. 26, 2020", 5 pgs.
"International Application Serial No. PCT/EP2020/058201, Written Opinion dated Jun. 26, 2020", 8 pgs.
"International Application Serial No. PCT/EP2020/058210, International Search Report dated Jun. 29, 2020", 4 pgs.
"International Application Serial No. PCT/EP2020/058210, Written Opinion dated Jun. 29, 2020", 13 pgs.
"International Application Serial No. PCT/EP2020/058216, International Search Report dated Jun. 26, 2020", 5 pgs.
"International Application Serial No. PCT/EP2020/058216, Written Opinion dated Jun. 26, 2020", 8 pgs.
"International Application Serial No. PCT/EP2020/058218, International Search Report dated Jun. 15, 2020", 5 pgs.
"International Application Serial No. PCT/EP2020/058218, Written Opinion dated Jun. 15, 2020", 6 pgs.
"International Application Serial No. PCT/EP2020/058221, International Search Report dated Jun. 29, 2020", 5 pgs.
"International Application Serial No. PCT/EP2020/058221, Written Opinion dated Jun. 29, 2020", 10 pgs.
"European Application Serial No. 19801788.1, Response to Communication pursuant to Rules 161(1) and 162 EPC filed Nov. 24, 2021", 18 pgs.
"European Application Serial No. 21210676.9, Extended European Search Report dated Jan. 14, 2022", 7 pgs.
"Indian Application Serial No. 202117019181, First Examination Report dated Feb. 22, 2022", w/ English Translation, 9 pgs.
"Indian Application Serial No. 202117019181, First Examination Report dated Feb. 22, 2022", w/ English translation, 7 pgs.
"Australian Application Serial No. 2019373730, First Examination Report dated Apr. 11, 2022", 4 pgs.
"Canadian Application Serial No. 3,070,588, Non Final Office Action dated May 12, 2022", 4 pgs.
"U.S. Appl. No. 16/828,001, Notice of Allowance dated Jun. 8, 2022", 10 pgs.
"Australian Application Serial No. 2020247109, First Examination Report dated Jun. 21, 2022", 3 pgs.
"Australian Application Serial No. 2020249424, First Examination Report dated Jul. 7, 2022", 3 pgs.
"Australian Application Serial No. 2020249420, First Examination Report dated Jul. 12, 2022", 3 pgs.
"Application Serial No. 17 812,426, Preliminary Amendment Filed Jul. 13, 2022", 12 pgs.
"Japanese Application Serial No. 2021-523189, Notification of Reasons for Refusal dated Jul. 12, 2022", w/ English translation, 14 pgs.
"Australian Application Serial No. 2020249425, First Examination Report dated Jul. 20, 2022", 3 pgs.
"Australian Application Serial No. 2020247388, First Examination Report dated Jul. 26, 2022", 3 pgs.
"Indian Application Serial No. 202117041276, First Examination Report dated Aug. 29, 2022", w/ English Translation, 5 pgs.
"European Application Serial No. 21210676.9, Voluntary Amendment filed on Aug. 4, 2022", 11 pgs.
"Indian Application Serial No. 202117041414, First Examination Report dated Sep. 5, 2022", w/ English Translation, 6 pgs.
"Indian Application Serial No. 202117041409, First Examination Report dated Sep. 7, 2022", w/ English Translation, 6 pgs.
"Indian Application Serial No. 202117019181, Response filed Aug. 22, 2022 to First Examination Report dated Feb. 22, 2022", W/ English Claims, 22 pgs.
"Indian Application Serial No. 202117041714, First Examination Report dated Sep. 7, 2022", w/ English Translation, 8 pgs.
"Indian Application Serial No. 202117041712, First Examination Report dated Sep. 8, 2022", w/ English Translation, 5 pgs.
"Australian Application Serial No. 2019373730, Response Filed Aug. 26, 22 to First Examination Report dated Apr. 11, 2022", 15 pgs.

(56) References Cited

OTHER PUBLICATIONS

"Canadian Application Serial No. 3,070,588, Response Filed Sep. 8, 2022 to Non Final Office Action dated May 12, 2022", 15 pgs.
"Indian Application Serial No. 202117041715, Response Filed Sep. 9, 22 to First Examination Report dated Mar. 15, 2022", W/ English Claims, 9 pgs.
"Indian Application Serial No. 202117041715, Voluntary Amendment Filed Sep. 15, 2022", 70 pgs.
"Indian Application Serial No. 202117042210, Voluntary Amendment Filed Sep. 15, 2022", W/ English Claims, 12 pgs.
"Indian Application Serial No. 202117042210, Response Filed Sep. 16, 2022 to First Examination Report dated Mar. 17, 2022", W/ English Claims, 11 pgs.
"Australian Application Serial No. 2020249420, Response Filed Sep. 21, 2022 to First Examination Report dated Jul. 12, 2022", 12 pgs.
"Japanese Application Serial No. 2021-557175, Notification of Reasons for Refusal dated Sep. 27, 2022", w/ English Translation, 6 pgs.
"Japanese Application Serial No. 2021-557177, Notification of Reasons for Refusal dated Sep. 27, 2022", w/ English Translation, 18 pgs.
"Australian Application Serial No. 2020247109, Response Filed Oct. 3, 2022 to First Examination Report dated Jun. 21, 2022", 10 pgs.
"Japanese Application Serial No. 2021-523189, Response Filed Oct. 5, 2022 to Notification of Reasons for Refusal dated Jul. 12, 2022", W/ English Claims, 21 pgs.
Canadeo, C. M, "Code selection for enhancing UWB multiple access communication performance using TH-PPM and DS-BPSK modulations", 2003 IEEE Wireless Communications and Networking, WCNC 2003, [Online] Retrieved from the internet: < https://ieeexplore.ieee.org/stamp/stamp.jsp?tp=&arnumber=1200432>, (2003), 678-682.
Drutarovsky, Milos, "Real-Time Wireless UWB Sensor Network for Person Monitoring", 2017 14th International Conference on Telecommunications (ConTEL), [Online] Retrieved from the internet: < https://ieeexplore.ieee.org/stamp/stamp.jsp?tp=&arnumber=8000034>, (2017), 19-26.
Hu, Sanming, "Measurements of UWB Antennas Backscattering Characteristics for RFID Systems", 2007 IEEE International Conference on Ultra-Wideband, [Online] Retrieved from the internet: < https://ieeexplore.ieee.org/stamp/stamp.jsp?tp=&arnumber=4380922>, (2007), 94-99.
"U.S. Appl. No. 17/309,102, Non Final Office Action dated Mar. 28, 2023", 10 pgs.
"U.S. Appl. No. 17/593,174, Non Final Office Action dated Apr. 27, 2023", 11 pgs.
"U.S. Appl. No. 17/593,336, Non Final Office Action dated Apr. 3, 2023", 12 pgs.
"U.S. Appl. No. 17/593,338, Non Final Office Action dated Dec. 20, 2022", 10 pgs.
"U.S. Appl. No. 17/593,338, Response filed Mar. 1, 2023 to Non Final Office Action dated Dec. 20, 2022", 12 pgs.
"U.S. Appl. No. 17/593,342, Non Final Office Action dated Jan. 25, 2023", 12 pgs.
"U.S. Appl. No. 17/593,342, Notice of Allowance dated May 10, 2023", 5 pgs.
"U.S. Appl. No. 17/593,342, Response filed Apr. 12, 2023 to Non Final Office Action dated Jan. 25, 2023", 13 pgs.
"U.S. Appl. No. 17/593,342, Supplemental Notice of Allowability dated May 22, 2023", 2 pgs.
"U.S. Appl. No. 17/812,426, Non Final Office Action dated Mar. 2, 2023", 10 pgs.
"U.S. Appl. No. 17/812,426, Notice of Allowance dated May 8, 2023", 10 pgs.
"U.S. Appl. No. 17/812,426, Response filed Apr. 19, 2023 to Non Final Office Action dated Mar. 2, 2023", 9 pgs.
"Australia Application Serial No. 2020247107, Subsequent Examiners Report dated Feb. 28 2023", 3 pgs.
"Australian Application Serial No. 2019373730, Response Filed Dec. 1, 22 to Subsequent Examiners Report dated Sep. 21, 2022", 18 pgs.
"Australian Application Serial No. 2019373730, Subsequent Examiners Report dated Sep. 21, 2022", 7 pgs.
"Australian Application Serial No. 2020247107, First Examination Report dated Sep. 13, 2022", 4 pgs.
"Australian Application Serial No. 2020247107, Response Filed Jan. 31, 2023 to First Examination Report dated Sep. 13, 2022", 15 pgs.
"Australian Application Serial No. 2020247109, Response Filed Jan. 31, 2023 to Subsequent Examiners Report dated Oct. 28, 2022", 8 pgs.
"Australian Application Serial No. 2020247109, Subsequent Examiners Report dated Oct. 28, 2022", 3 pgs.
"Australian Application Serial No. 2020247386, Response Filed Dec. 21, 2022 to First Examination Report dated Aug. 30, 2022", 11 pgs.
"Australian Application Serial No. 2020247386, Response Filed Mar. 20, 2023 to Subsequent Examiners Report dated Dec. 23, 2022", No. Claim Amendments, 2 pgs.
"Australian Application Serial No. 2020247386, Subsequent Examiners Report dated Apr. 13, 2023", 3 pgs.
"Australian Application Serial No. 2020247386, Subsequent Examiners Report dated Dec. 12, 2022", 3 pgs.
"Australian Application Serial No. 2020247388, Response Filed Jan. 31, 2023 to Subsequent Examiners Report dated Nov. 17, 2022", 12 pgs.
"Australian Application Serial No. 2020247388, Response filed Oct. 26, 2022 to First Examination Report dated Jul. 26, 2022", 120 pgs.
"Australian Application Serial No. 2020247388, Subsequent Examiners Report dated NOv. 17, 2022", 3 pgs.
"Australian Application Serial No. 2020249424, Response filed Oct. 26, 2022 to First Examination Report dated Jul. 7, 2022", 121 pgs.
"Australian Application Serial No. 2020249425, Response filed Oct. 11, 2022 Filed to First Examination Report dated Jul. 20, 2022", 9 pgs.
"Canadian Application Serial No. 3,117,588, Examiners Rule 86(2) Requisition dated Mar. 14, 2023", 7 pgs.
"Canadian Application Serial No. 3,134,738, Examiner's Rule 86(2) Requisition dated Nov. 18, 2022", 4 pgs.
"Canadian Application Serial No. 3,134,738, Response File Mar. 13, 2023 to Examiner's Rule 86(2) Requisition dated Nov. 18, 2022", 10 pgs.
"Canadian Application Serial No. 3,134,749, Response Filed Mar. 27, 2023 to Examiner's Rule 86(2) Report dated Dec. 1, 2022", 10 pgs.
"Canadian Application Serial No. 3,134,751, Examiner's Rule 86(2) Requisition dated Nov. 18, 2022", 5 pgs.
"Canadian Application Serial No. 3,134,751, Response Filed Mar. 16, 2023 to Examiner's Rule 86(2) Requisition dated Nov. 18, 2022", 13 pgs.
"Canadian Application Serial No. 3,134,864, Examiner's Rule 86(2) Requisition dated NOv. 18, 2022", 4 pgs.
"Canadian Application Serial No. 3,134,864, Response Filed Mar. 13, 2023 to Examiner's Rule 86(2) Requisition dated Nov. 18, 2022", 7 pgs.
"Canadian Application Serial No. 3,134,866, Examiner's Rule 86(2) Requisition dated Nov. 18, 2022", 4 pgs.
"Canadian Application Serial No. 3,134,866, Response Filed Mar. 8, 32 to Examiner's Rule 86(2) Requisition dated Nov. 18, 2022", 8 pgs.
"Canadian Application Serial No. 3,134,867, Examiner's Rule 86(2) Requisition dated Nov. 18, 2022", 4 pgs.
"Canadian Application Serial No. 3,134,867, Response Filed Mar. 9, 2023 to Examiner's Rule 86(2) Requisition dated Nov. 18, 2022", No. Claim Amendments, 10 pgs.
"Canadian Application Serial No. 3,134,931, Examiner's Rule 86(2) Requisition dated Dec. 8, 2022", 3 pgs.

(56) References Cited

OTHER PUBLICATIONS

"Canadian Application Serial No. 3,134,931, Response Filed Apr. 3, 23 to Examiner's Rule 86(2) Requisition dated Dec. 8, 2022", 12 pgs.
"Canadian Application Serial No. 3,134,749, Examiner's Rule 86(2) Report dated Dec. 1, 2022", 4 pgs.
"Chinese Application Serial No. 202080022914.1, Office Action dated Oct. 24, 2022", w/ English translation, 20 pgs.
"Chinese Application Serial No. 202080022914.1, Response Filed Feb. 17, 2023 to Office Action dated Oct. 24, 2022", W/ English Claims, 12 pgs.
"Chinese Application Serial No. 202080023684.0, Office Action dated Mar. 22, 2023", w/ English Translation, 15 pgs.
"Chinese Application Serial No. 202080023684.0, Office Action dated Sep. 30, 2022", w/ English Translation, 23 pgs.
"Chinese Application Serial No. 202080023684.0, Response Filed Jan. 29, 2023 to Office Action dated Sep. 30, 2022", W/ English Claims, 33 pgs.
"European Application Serial No. 20714545.9, Communication Pursuant to Rule 114(2) EPC dated Nov. 21, 2022", 53 pgs.
"European Application Serial No. 20714545.9, Communication Pursuant to Rule 114(2) EPC dated Dec. 1, 2022", 7 pgs.
"European Application Serial No. 22198344.8, Extended European Search Report dated Jan. 5, 2023", 10 pgs.
"Indian Application Serial No. 202117041276, Response Filed Feb. 28, 2023 to First Examination Report dated Aug. 29, 2022", W/ English Claims, 19 pgs.
"Indian Application Serial No. 202117041409, Response Filed Mar. 7, 2023 to First Examination Report dated Sep. 7, 2022", W/ English Claims, 17 pgs.
"Indian Application Serial No. 202117041409; Voluntary Amendment Filed Mar. 7, 2023", W/ English Claims, 11 pgs.
"Indian Application Serial No. 202117041414, Response Filed Mar. 3, 2023 to First Examination Report dated Sep. 5, 2022", W/ English Claims, 23 pgs.
"Indian Application Serial No. 202117041414, Voluntary Amendment Filed Mar. 3, 2023", W/ English Claims, 11 pgs.
"Indian Application Serial No. 202117041712, Response Filed Mar. 7, 23 to First Examination Report dated Sep. 8, 2022", W/ English Claims, 16 pgs.
"Indian Application Serial No. 202117041714, Response Filed Mar. 7, 2023 to First Examination Report dated Sep. 7, 2022", W/ English Claims, 17 pgs.
"Japanese Application Serial No. 2021-557174, Notification of Reasons for Refusal dated Apr. 18, 2023", w/ English Translation, 10 pgs.
"Japanese Application Serial No. 2021-557174, Notification of Reasons for Refusal dated Nov. 1, 2022", w/ English Translation, 8 pgs.
"Japanese Application Serial No. 2021-557174, Response Filed Jan. 18, 2023 to Notification of Reasons for Refusal dated Nov. 1, 2022", W/ English Claims, 17 pgs.
"Japanese Application Serial No. 2021-557175, Response Filed Dec. 19, 2022 to Notification of Reasons for Refusal dated Sep. 27, 2022", W/ English Claims, 16 pgs.
"Japanese Application Serial No. 2021-557176, Notification of Reasons for Refusal dated Nov. 1, 2022", w/ English Translation, 12 pgs.
"Japanese Application Serial No. 2021-557176, Response Filed Jan. 18, 2023 to Notification of Reasons for Refusal dated Nov. 1, 2022", W/ English Claims, 15 pgs.
"Japanese Application Serial No. 2021-557177, Response Filed Dec. 16, 2022 to Notification of Reasons for Refusal dated Sep. 27, 2022", W/ English Claims, 16 pgs.
"Japanese Application Serial No. 2021-557178, Final Notification of Reasons for Refusal dated May 9, 2023", w/ English Translation, 4 pgs.
"Japanese Application Serial No. 2021-557178, Notification of Reasons for Refusal dated Oct. 18, 2022", w/ English translation, 9 pgs.
"Japanese Application Serial No. 2021-557178, Request Filed Jan. 13, 2023 to Notification of Reasons for Refusal dated Oct. 18, 2022", W/ English Claims, 16 pgs.
"Japanese Application Serial No. 2021-557179, Notification of Reasons for Refusal dated Oct. 18, 2022", w/ English translation, 10 pgs.
"Japanese Application Serial No. 2021-557179, Notification of Reasons for Rejection dated May 9, 2023", W/English Translation, 6 pgs.
"Japanese Application Serial No. 2021-557179, Response Filed Jan. 13, 2023 to Notification of Reasons for Refusal dated Oct. 18, 2022", W/ English Claims, 18 pgs.
"Japanese Application Serial No. 2021-557180, Final Notification of Reasons for Refusal dated Apr. 18, 2023", w/ English translation, 8 pgs.
"Japanese Application Serial No. 2021-557180, Notification of Reasons for Refusal dated Nov. 1, 2022", w/ English Translation, 10 pgs.
"Japanese Application Serial No. 2021-557180, Response Filed Jan. 18, 23 to Notification of Reasons for Refusal dated Nov. 1, 2022", W/ English Claims, 19 pgs.
"Korean Application Serial No. 10-2021-7013164, Notice of Preliminary Rejection dated Mar. 31, 2023", w/ English Translation, 13 pgs.
Angelico, Bruno, "Ultra-wideband Performance in a Dense Multipath Environment with Time and Spatial Diversity", 16th IST Mobile and Wireless Communications Summit, [Online]. Retrieved from the Internet: <https://ieeexplore.ieee.org/stamp/stamp.jsp?tp=&arnumber=4299254>, (2007).
Huang, Jingjing, et al., "Secret Key Generation Exploiting Ultra-wideband Indoor Wireless Channel Characteristics", IEEE Military Communications Conference, [Online]. Retrieved from the Internet: <https://ieeexplore.ieee.org/stamp/stamp.jsp?tp=&arnumber=6735631>, (2013), 5 pgs.
Madiseh, Ghoreishi M, "Verification of Secret Key Generation from UWB Channel Observations", IEEE International Conference on Communications, [Online]. Retrieved from the Internet: <https://ieeexplore.ieee.org/stamp/stamp.jsp?tp=&arnumber=5199564>, (2009), 5 pgs.
Miri, Jamel, "Privacy group distance bounding protocol on TH-UWB based NTRU public key cryptosystem", Sixth International Conference on Communications and Networking, [Online]. Retrieved from the Internet: <https://ieeexplore.ieee.org/stamp/stamp.jsp?tp=&arnumber=8285598>, (2017).
Ranganathan, Aanjhan, et al., "Are We Really Close? Verifying Proximity in Wireless Systems", in IEEE Security & Privacy, vol. 15, No. 3, (May/Jun. 2017), 7 pgs.
Somayazulu, V S, "Multiple access performance in UWB systems using time hopping vs. direct sequence spreading", IEEE Wireless Communications and Networking Conference Record, [Online]. Retrieved from the Internet: <https://ieeexplore.ieee.org/stamp/stamp.jsp?tp=&arnumber=993322>, (2002).
U.S. Appl. No. 17/812,426 U.S. Pat. No. 11,765,588, filed Jul. 13, 2022, Physical Access Control Systems With Localization-Based Intent Detection.
U.S. Appl. No. 18/446,657, filed Aug. 9, 2023, Physical Access Control Systems With Localization-Based Intent Detection.
"Application Serial No. 17 593,174, Response filed Jul. 27, 2023 to Non Final Office Action dated Apr. 27, 2023", 10 pages.
"European Application Serial No. 20714986.5, Communication Pursuant to Article 94(3) EPC dated Jun. 30, 2023", 7 pages.
"Canadian Application Serial No. 3,134,749, Examiners Rule 86(2) Report dated Sep. 13, 2023", 4 pages.
"Australia Application Serial No. 2020247107, Response Filed May 22, 2023 to Subsequent Examiners Report dated Feb. 28, 2023", No. Amendments to Claims, 3 pgs.
"Australian Application Serial No. 2020247386, Response Filed May 29, 2023 to Subsequent Examiners Report dated Apr. 13, 2023", No. Amendments to Claims, 2 pgs.
"Chinese Application Serial No. 202080023684.0, Response Filed Jun. 5, 2023 to Office Action dated Mar. 22, 2023", with Concise Statement of Relevance, 4 pages.

(56) References Cited

OTHER PUBLICATIONS

"Application Serial No. 17 593,338, Notice of Allowance dated Jun. 14, 2023", 10 pgs.

"Korean Application Serial No. 10-2021-7013164, Response Filed May 30, 2023 to Notice of Preliminary Rejection dated Mar. 31, 2023", with English claims, 35 pages.

"Australian Application Serial No. 2020247107, Subsequent Examiners Report dated Jun. 22, 2023", 3 pgs.

"Application Serial No. 17 309,102, Response filed Jun. 26, 2023 to Non Final Office Action dated Mar. 28, 2023", 11 pgs.

"Application Serial No. 17 593,336, Response filed Jun. 28, 2023 to Non Final Office Action dated Apr. 3, 2023", 12 pgs.

"Application Serial No. 17 593,338, Supplemental Notice of Allowability dated Jul. 6, 2023", 3 pgs.

"Application Serial No. 17 593,340, Non Final Office Action dated Jul. 12, 2023", 8 pgs.

"Canadian Application Serial No. 3,117,588, Response Filed Jul. 6, 2023 to Examiners Rule 86(2) Requisition dated Mar. 14, 2023", 28 pgs.

"Japanese Application Serial No. 2021-557174, Response Filed Jul. 12, 2023 to Notification of Reasons for Refusal dated Apr. 18, 2023", with English claims, 11 pages.

"Japanese Application Serial No. 2021-557180, Response Filed Jul. 14, 2023 to Final Notification of Reasons for Refusal dated Apr. 18, 2023", with English claims, 10 pages.

"Application Serial No. 17 309,102, Final Office Action dated Jul. 25, 2023", 10 pgs.

"Korean Application Serial No. 10-2021-7030781, Notice of Preliminary Rejection dated Jul. 20, 2023", with English translation, 11 pages.

"Application Serial No. 17 593,342, Supplemental Notice of Allowability dated Aug. 1, 2023", 2 pgs.

"Application Serial No. 17 593,338, Supplemental Notice of Allowability dated Aug. 9, 2023", 3 pgs.

"Chinese Application Serial No. 202080023684.0, Decision of Rejection dated Jul. 27, 2023", with English translation, 17 pages.

"Korean Application Serial No. 10-2021-7030765, Notice of Preliminary Rejection dated Jul. 28, 2023", with English translation, 16 pages.

"Japanese Application Serial No. 2021-557178, Response Filed Aug. 4, 2023 to Final Notification of Reasons for Refusal dated May 9, 2023", with English claims, 10 pages.

"Japanese Application Serial No. 2021-557179, Response Filed Aug. 4, 2023 to Notification of Reasons for Rejection dated May 9, 2023", with English claims, 9 pages.

"Korean Application Serial No. 10-2021-7030699, Notice of Preliminary Rejection dated Jul. 28, 2023", with English translation, 11 pages.

"Application Serial No. 17 593,342, Supplemental Notice of Allowability dated Aug. 22, 2023", 2 pgs.

"Korean Application Serial No. 10-2021-7030785, Notice of Preliminary Rejection dated Jul. 28, 2023", with English translation, 11 pages.

"European Application Serial No. 22198344.8, Response Filed Aug. 11, 2023 Extended European Search Report dated Jan. 5, 2023", No. Claim Amendments, 8 pgs.

"Australian Application Serial No. 2020247107, Response Filed Aug. 14, 2023 to Subsequent Examiners Report dated Jun. 22, 2023", 13 pgs.

"Canadian Application Serial No. 3,134,864, Office Action dated Aug. 23, 2023", 3 pgs.

"Canadian Application Serial No. 3,134,867, Examiners Rule 86(2) Report dated Sep. 13, 2023", 5 pgs.

"Australian Application Serial No. 2023200489, First Examination Report dated Sep. 11, 2023", 3 pgs.

"Application Serial No. 17 593,338, Corrected Notice of Allowability dated Sep. 21, 2023", 3 pgs.

"Application Serial No. 17 309, 102, Response filed Sep. 22, 2023 to Final Office Action dated Jul. 25, 2023", 12 pgs.

"Chinese Application Serial No. 201980073003.9, Office Action dated Sep. 1, 2023", with English translation, 25 pages.

"Korean Application Serial No. 10-2021-7030696, Notice of Preliminary Rejection dated Sep. 19, 2023", with English translation, 6 pages.

"Application Serial No. 17 593,336, Notice of Allowance dated Oct. 2, 2023", 5 pgs.

"Application Serial No. 17 593,340, Response filed Oct. 11, 2023 to Non Final Office Action dated Jul. 12, 2023", 9 pgs.

"Canadian Application Serial No. 3,134,931, Office Action dated Oct. 5, 2023", 3 pgs.

"Korean Application Serial No. 10-2021-7030765, Response filed Sep. 21, 2023 to Notice of Preliminary Rejection dated Jul. 28, 2023", with English claims, 26 pages.

"Korean Application Serial No. 10-2021-7030699, Response filed Sep. 25, 2023 to Notice of Preliminary Rejection dated Jul. 28, 2023", with English claims 31 pages.

"Korean Application Serial No. 10-2021-7030785, Response filed Oct. 4, 2023 to Notice of Preliminary Rejection dated Jul. 28, 2023", with English claims 30 pages.

"U.S. Appl. No. 17/994,839, Notice of Allowability dated Oct. 27, 2023", 2 pages.

"U.S. Appl. No. 17/309,102, Notice of Allowance dated Oct. 19, 2023", 7 pgs.

"Japanese Application Serial No. 2023-005052, Notification of Reasons for Refusal dated Oct. 17, 2023", with English translation, 16 pages.

"U.S. Appl. No. 17/593,338, Corrected Notice of Allowability dated Oct. 20, 2023", 2 pgs.

"Korean Application Serial No. 10-2021-7030781, Response filed Sep. 20, 2023 to Notice of Preliminary Rejection dated Jul. 20, 2023", No Amendments to Claims, 10 pgs.

"Korean Application Serial No. 10-2021-7030782, Notice of Preliminary Rejection dated Nov. 23, 2023", with English translation, 9 pages.

* cited by examiner

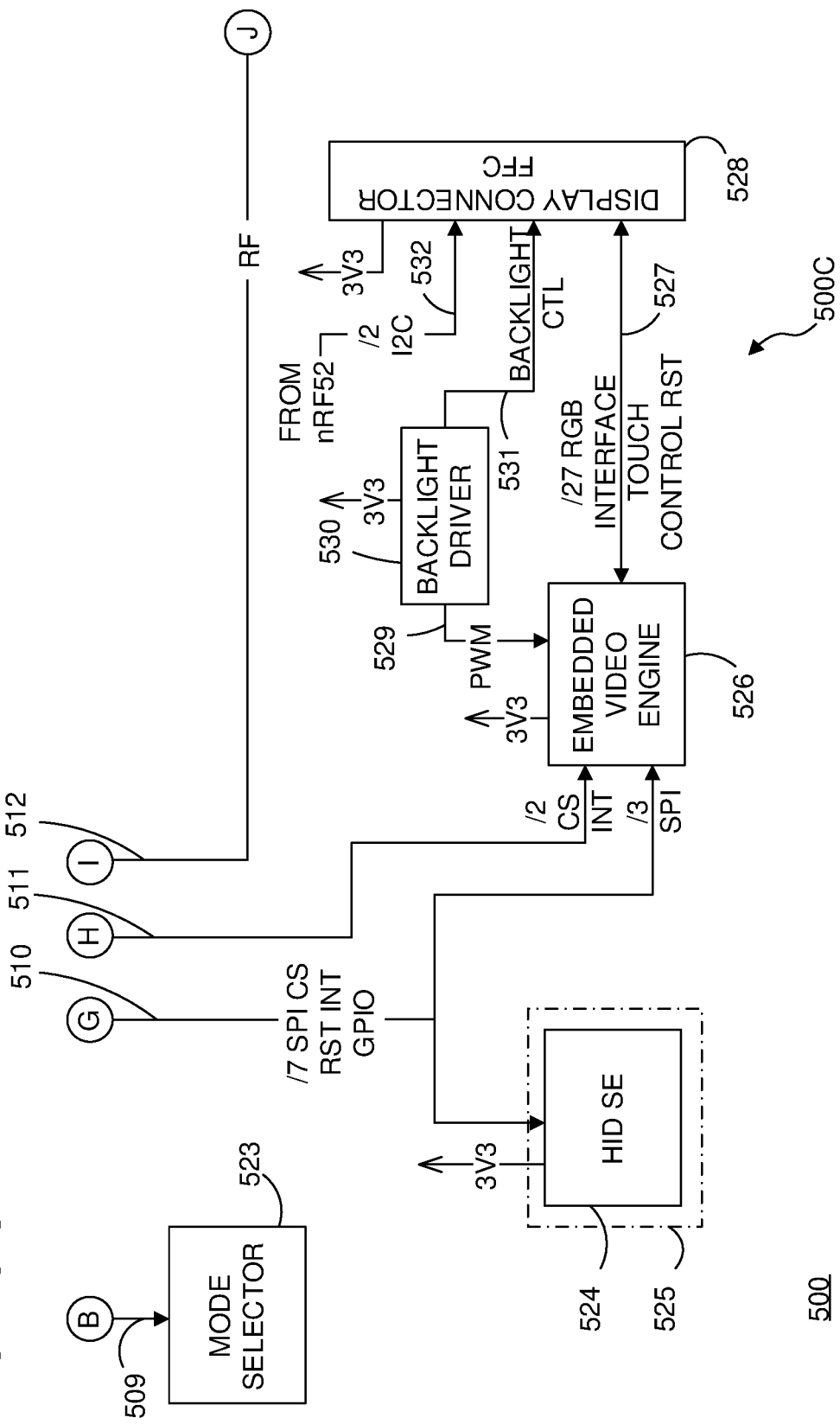

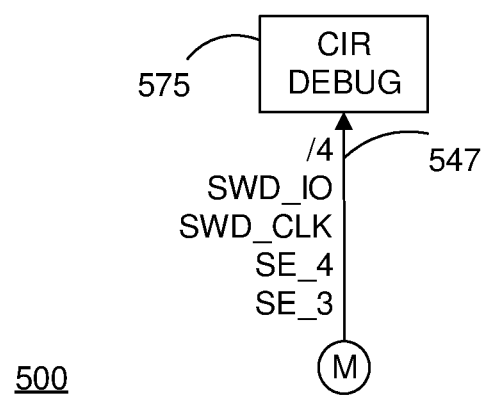

ULTRA-WIDE BAND DEVICE FOR ACCESS CONTROL READER SYSTEM

CROSS-REFERENCE TO RELATED APPLICATION(S)

This application is a national stage application under 35 U.S.C. § 371 of PCT Appl. No. PCT/EP2020/058201, titled "Ultra-Wide Band Device for Access Control Reader System," filed Mar. 24, 2020, which claims priority to U.S. Prov. Pat. Appl. No. 62/906,995, titled "Ultra-Wide Band Module for Physical Access Control System," filed Sep. 27, 2019, and to U.S. Prov. Pat. Appl. No. 62/823,341, titled "Physical Access Control Systems with Localization-Based Intent Detection," filed Mar. 25, 2019, each of which is hereby incorporated by reference herein in its entirety.

TECHNICAL FIELD

Embodiments of the present disclosure relate generally to access control systems and more specifically to embodiments of an ultra-wide band (UWB) device for access control systems.

BACKGROUND

Physical access control covers a range of systems and methods to govern access, for example by people, to secure areas or secure assets. Physical access control includes identification of authorized users and/or devices (e.g., vehicles, drones, etc.) and actuation of a gate, door, or other mechanism used to secure an area or actuation of a control mechanism, e.g., a physical or electronic/software control mechanism, permitting access to a secure asset. A PACS can include a reader (e.g., an online or offline reader) that holds authorization data and can be capable of determining whether credentials (e.g., from credential or credential devices such as radio frequency identification (RFID) chips in cards, fobs, or personal electronic devices such as mobile phones) are authorized for an actuator (e.g., door lock, door opener, software control mechanism, turning off an alarm, etc.). In other examples, a PACS can include a host server to which readers and/or actuators (e.g., via a controller) are connected in a centrally managed configuration. In centrally managed configurations, readers can obtain credentials from a credential or credential device and pass those credentials to the PACS host server. The host server can then determine whether the credentials authorize access to the secure area and command the actuator or other control mechanism accordingly.

BRIEF DESCRIPTION OF THE DRAWINGS

A more detailed understanding may be had from the following description, which is presented by way of example in conjunction with the following drawings, in which like reference numerals are used across the drawings in connection with like elements.

FIG. 5A-5G collectively depict an example architecture of an ultra-wide band module of the reader system of FIG. 1, in accordance with at least one embodiment.

DETAILED DESCRIPTION

Disclosed herein are embodiments of an ultra-wideband (UWB) module for an access control system. While described herein with respect to physical access control systems (PACS), the UWB module may be utilized for any other type of access control system. UWB is a radio frequency (RF) technique that uses short, low power, pulses over a wide frequency spectrum. The pulses can occur on the order of millions of times per second. The width of the frequency spectrum of a given UWB implementation is generally greater than the lesser of 500 megahertz (MHz) and twenty percent of an arithmetic center frequency of the frequency spectrum for the given UWB implementation.

UWB can be used for communication by encoding data via time modulation (e.g., pulse-position encoding). Here, symbols are specified by pulses on a subset of time units out of a set of available time units. Other examples of types of UWB encodings include amplitude modulation and polarity modulation. The wide band transmission tends to be more robust to multipath fading than carrier-based transmission techniques. Further, the lower power of pulses at any given frequency tends to reduce interference with carrier-based communication techniques.

Figure 1:
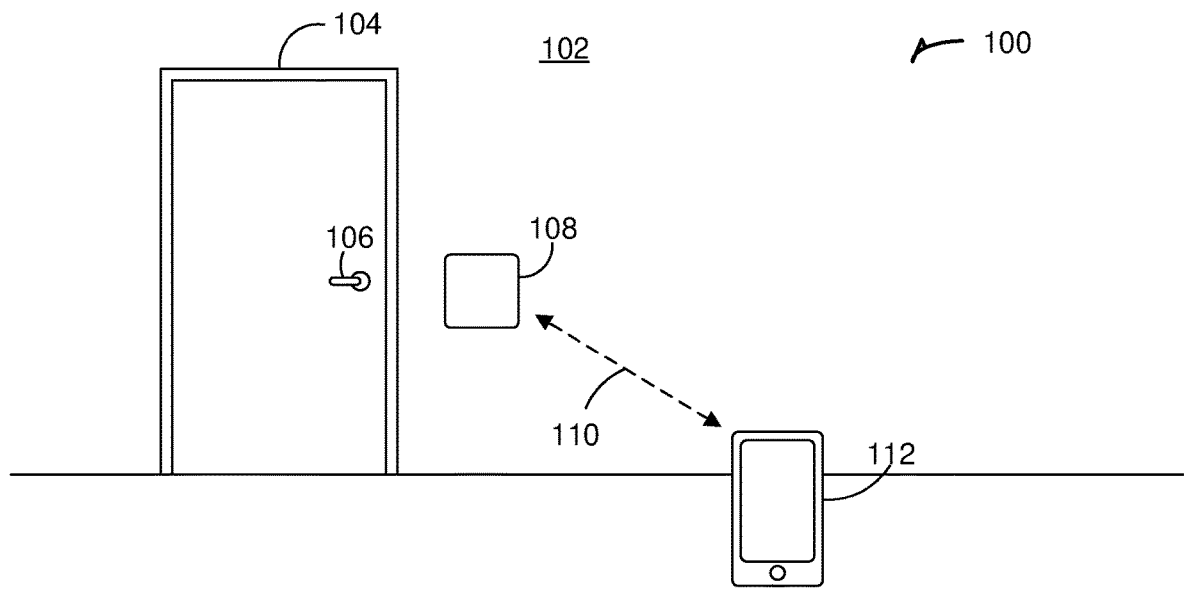
FIG. 1 depicts an example scenario in which a physical access control system (PACS) that includes an example reader system could be used, in accordance with at least one embodiment.

FIG. 1 depicts an example scenario 100 in which a PACS could be used, in accordance with at least one embodiment. As shown in FIG. 1, a wall 102 has disposed therein a door 104. In an example situation, a secured area lies behind the door 104, which has a lockable handle 106 that grants access to the secured area when in an unlocked state and instead prevents access to the secured area when in a locked state.

A reader system 108 is positioned proximate to the handle 106 of the door 104. In an embodiment, the handle 106 has as its default state to be in the locked state. The reader system 108 is operable to selectively place the handle 106 in the unlocked state responsive to being presented with an authorized credential contained in a credential device 112, which can communicate with the reader system 108 via a wireless interface 110. In various different embodiments, the credential device 112 could be or include a keycard, a fob, a mobile device (e.g., a smart phone), and/or any other suitable credential device having the communication capabilities and credentials to carry out embodiments of the present disclosure.

It should be understood that the present disclosure is applicable to numerous types of PACSs being used to secure numerous types of areas and/or other resources, assets, and/or the like. The scenario 100 of FIG. 1 is presented purely by way of example and not limitation.

Figure 2:
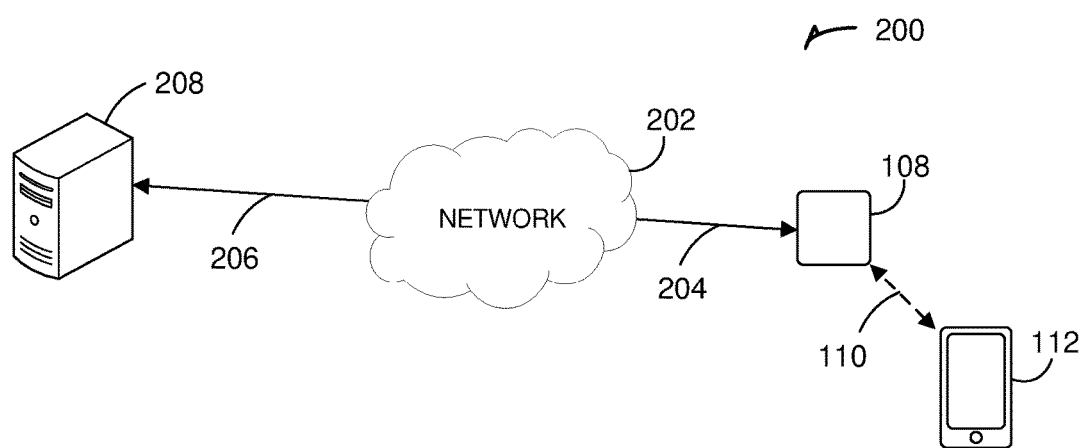
FIG. 2 depicts an example communication context in which the PACS of FIG. 1 could operate, in accordance with at least one embodiment.

FIG. 2 depicts an example communication context 200 in which the PACS (including, e.g., the reader system 108) of FIG. 1 could operate, in accordance with at least one embodiment. As shown in FIG. 2, the reader system 108 could be communicatively connected with a network 202 via a communication link 204. Furthermore, a server 208 could be communicatively connected with the network 202 via a communication link 206. In the present disclosure, a communication link could include one or more wireless-communication links and/or one or more wired-communication links, and could include one or more intermediate devices such as access points, network access servers, switches, routers, bridges, and/or the like. Furthermore, the network 202 could be or include a data-communication network such as an Internet Protocol (IP) network and/or one or more communication network of any other type.

The server 208 could perform one or more functions for the reader system 108 such as authorization, authentication, and/or the like. In some embodiments, the reader system 108 performs such functions locally, perhaps as a standalone unit, perhaps involving communication with one or more other devices, systems, servers, and/or the like via a local area network (LAN), for example. The server 208 could include a communication interface, a processor, and data storage containing instructions executable by the processor for carrying out the functions of the server 208.

Figure 3A:
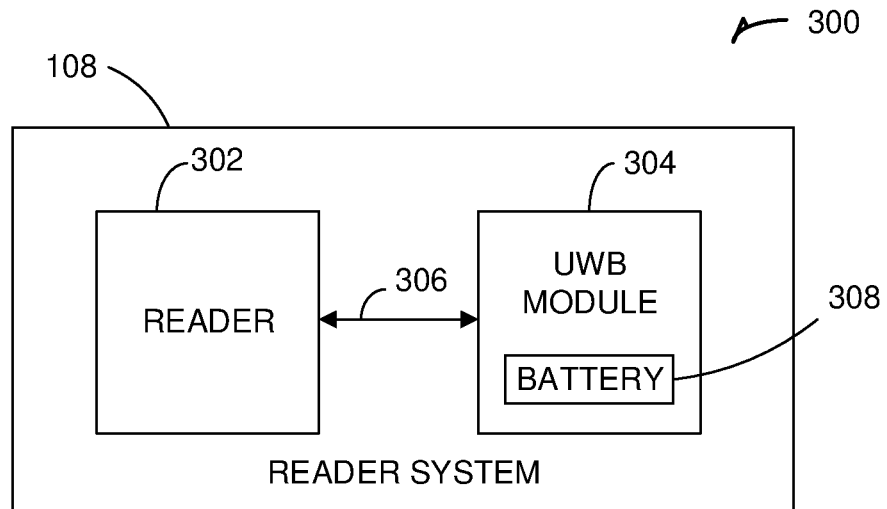
FIGS. 3A and 3B depict example architectures of the reader system of FIG. 1, in accordance with at least one embodiment.

FIG. 3A depicts an example architecture 300 of the reader system 108, in accordance with at least one embodiment. As shown in FIG. 3A, the reader system 108 could include a reader 302 and a UWB module 304 that are communicatively connected with one another via a communication link 306. The communication link 306 may be wired or wireless. In one example, the communication link 306 is a BLE communication link. In some embodiments, the reader 302 is equipped and configured to use wireless communication such as NFC and/or Bluetooth (e.g., Bluetooth Low Energy (BLE)) to carry out communication with credential devices and to selectively place the handle 106 in the unlocked state responsive to being presented with an authorized credential contained in a credential device (e.g., the credential device 112).

The reader 302 could include a wireless-communication interface for communicating according to NFC, BLE, and/or the like, and could also include a wired-communication interface for communicating according to Universal Serial Bus (USB) connections, Ethernet connections, and/or the like. The reader 302 could also include a processor and data storage containing instructions executable by the processor for carrying out the functions of the reader 302.

In some embodiments, the reader 302 was installed and in use prior to the UWB module 304 being connected as an add-on module. In other embodiments, the reader 302 and the UWB module 304 are installed together as (or as at least part of) the reader system 108. The UWB module 304 could be connected via the communication link 306 to an existing hardware port (or expansion port, expansion slot, or the like) of the reader 302. In some embodiments, the communication link 306 is or includes a data cable. Further detail regarding an example architecture of the UWB module 304 is provided below in connection with FIG. 5A through FIG. 5G.

In an example, a user carrying a credential device may approach the reader system 108. Upon the credential device coming into a threshold range of the reader system 108, a credential may be exchanged using a low energy wireless protocol, such as Bluetooth Low Energy (BLE), for example. This credential exchange may be coordinated using the reader 302, for example. The reader 302 may then establish a secret, such as a scrambled time stamp (STS), with the credential device to facilitate ranging using UWB communication. UWB ranging may be carried out using the UWB module 304, for example. This may occur upon receipt of data from the reader 302. The data may include the STS, an identifier of the credential such as a PACS ID, and the like. Using the ranging, one or more of the reader 302 or the UWB module 304 may be used to derive an intent of the user in order to identify an intent trigger. Once an intent trigger is identified, the reader 302 may release the credential to allow access to the user.

The UWB module may include a battery 308 or other type of local power source including energy harvesters, capacitors, and the like. The battery 308 may be used to provide power for the UWB module 304 such that it is unnecessary for the UWB module 304 to receive power from the reader system 108, the door lock battery, or any other external power source. This can conserve power for the reader system 108 and may be advantageous as the it may be easier to replace a battery in the removeable UWB module 304 than any other battery in the reader system 108.

Figure 3B:
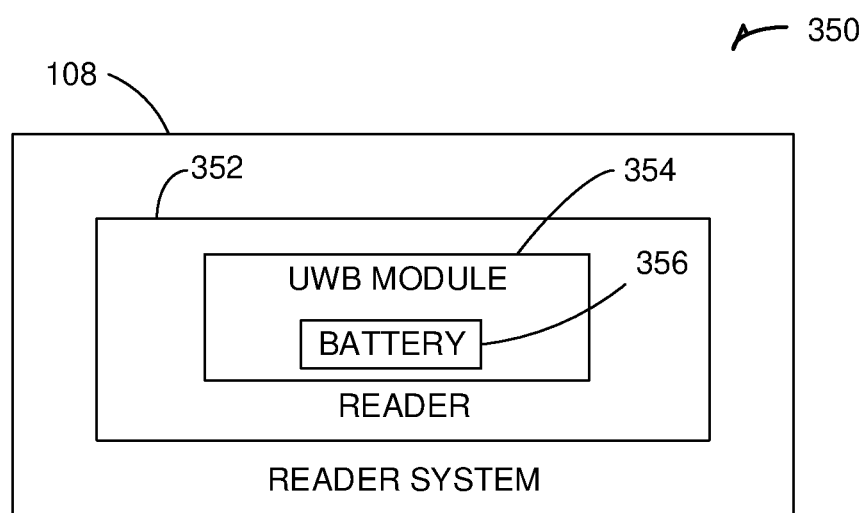

FIG. 3B depicts another example architecture 350 of the reader system 108, in accordance with at least one embodiment. As shown in FIG. 3B, the reader system 108 could include a reader 352 that itself could include (e.g., as an on-board module, component, or the like) a UWB module 354 that includes a battery 356. In an embodiment, the UWB module 354 is implemented as an integrated circuit (IC) that is plugged into a board (e.g., a main motherboard) of the reader 352.

As a general matter, the reader 352 could be similar to the reader 302 of FIG. 3A, and thus is not described here in as great of detail. As with the architecture 300 that is described above in connection with FIG. 3A, in the case of the architecture 350 of FIG. 4, the reader 352 could be a previously installed reader with the UWB module 354 being a later add on, or it could be the case that the reader 352 and the UWB module 354 are associated with a common, concurrent installation as (or as at least part of) the reader system 108.

Figure 4:
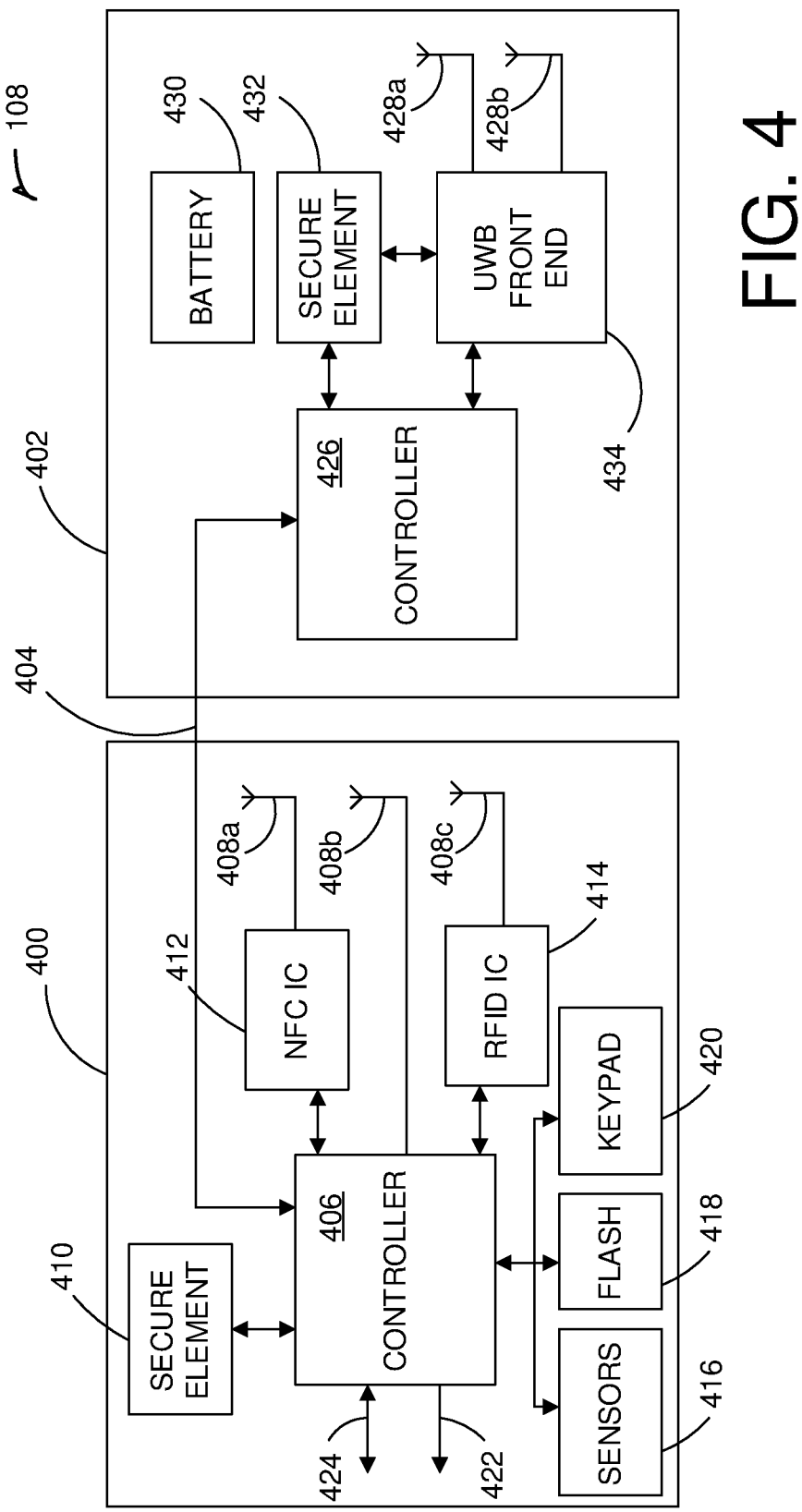
FIG. 4 depicts an example architecture of the reader system of FIG. 1, in accordance with at least one embodiment.

FIG. 4 depicts another example architecture 400 for the reader system 108. The reader system 108 includes a reader 400 and a UWB module 402 configured to communicate over a communication link 404. The communication link may be wired or wireless. For example, the reader 400 may be configured to communicate with the UWB module 402 using BLE. The reader 400 includes a controller 406, antennas 408a-408c, a secure element 410, an NFC IC 412, an RFID IC 414, sensors 416, flash memory 418, keypad 420, and interfaces 422 and 424. The controller 406 may be a BLE SoC microcontroller, or any other type of control circuit. The controller 406 may be capable of NFC communication through the NFC IC 412 and antenna 408a. The controller may be capable of BLE communication using the antenna 408b, and may be capable of RFID communication through the RFID IC 414 and the antenna 408c. The interfaces 422 and 424 may be a Wiegand interface and an RS485 interface, or any other interface types. The secure element 410 may be configured to cache secure data such as an STS, PACS ID, and the like. The components of the reader 400 may be collected within a first housing.

The UWB module 402 includes a controller 426, antennas 428a and 428b, a battery 430, a secure element 432, and a UWB front end 434. The controller 426 may also be a BLE SoC microcontroller, or any other type of control circuit. The battery 430 may be used to provide power for the UWB module 402 so that the UWB module does not need to be powered by the reader power, lock power, or any other power source. The controller 426 may be capable of UWB communication through the UWB front end 434, which may be any circuit configured to package and receive UWB message for transmission and receipt through the antennas 428a and 428b. The secure element 432 may be configured to cache secure data such as an STS, PACS ID, and the like. The components of the UWB modules 402 may be described in further detail with respect to FIGS. 5A-5G below. The components of the UWB module 402 may be collected within a second housing separate from the reader 400.

In an example, a user carrying a credential device may approach the reader 400. Upon the credential device coming into a threshold range of the reader system 108, the controller 406 may exchange a credential with the credential device using BLE through the antenna 408b. The controller 406 may then establish a secret, such as a scrambled time stamp (STS), with the credential device to facilitate ranging using UWB communication. UWB ranging may be carried out by the controller 426 of the UWB module 402, for example. This may occur upon receipt of data from the controller 406. The data may include the STS, an identifier of the credential such as a PACS ID, and the like. Using the ranging, one or more of the controllers 406 and 426 may be used to derive an intent of the user in order to identify an intent trigger (such as moving to a specific position). Once an intent trigger is identified, the controller 406 may release the credential to allow access to the user.

FIG. 5A through FIG. 5G collectively depict an example UWB-module architecture 500 of a UWB module (e.g., the UWB module 304 of FIG. 3A, the UWB module 354 of FIG. 3B of FIG. 3B, the UWB module 402 of FIG. 4, and/or the like), in accordance with at least one embodiment. In an embodiment, the UWB-module architecture 500 is implemented as one or more circuit boards on which one or more of the recited components reside. In other embodiments, distributed architectures can be used. Furthermore, it is noted that a number of specific components, connections, and the like are presented in a specific arrangement in the architecture 500 that is depicted and described in connection with FIG. 5A through FIG. 5G. It should be understood that this is by way of example and not limitation. In various embodiments, different components and/or different connections could be used in different arrangements, and some components can be omitted in some embodiments. Moreover, some components could be combined. In addition or instead, the functions of one or more components could be distributed across multiple components or combined in different ways. Various different input voltages, crystal oscillators, connectors, integrated circuits, and/or the like could be used in different embodiments. Various components related to debugging could be omitted from some embodiments.

Figure 5A:
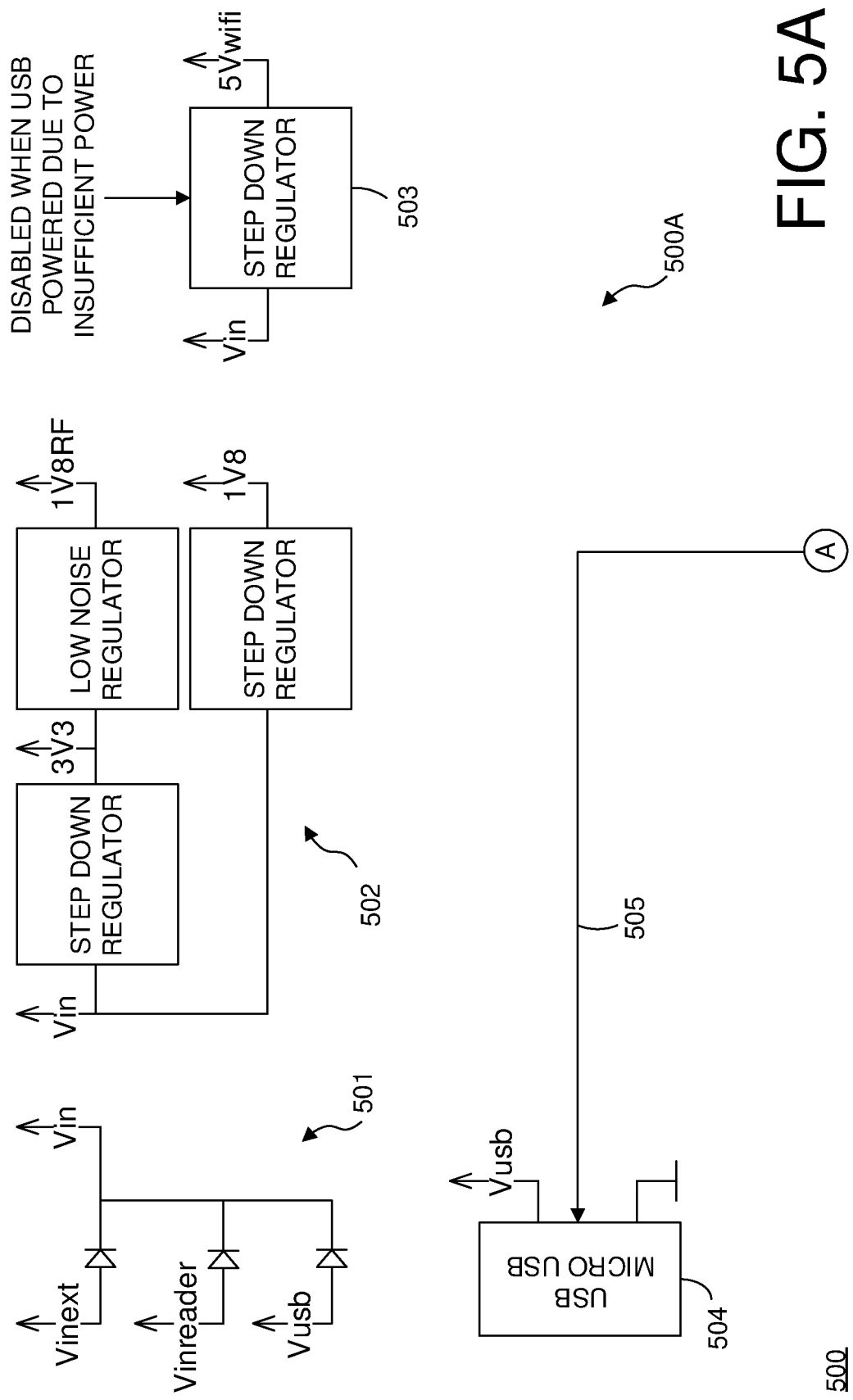

FIG. 5A depicts a first portion 500A of the example UWB-module architecture 500, in accordance with at least one embodiment. The first portion 500A includes a voltage arrangement 501 that includes voltages $V_{inext}$, $V_{in}$, $V_{inreader}$, and $V_{usb}$. Also included is a voltage-regulator arrangement 502, which includes a first step down regulator (4-17V to 3V3), a low noise regulator (3V3 to 1V8), and a second step down regulator (4-17V to 1V8). The first step down regulator is connected to $V_{in}$ and the second step down regulator at a first connection, and to input voltage 3V3 at a second connection. The low noise regulator is connected between input voltage 3V3 and $1V8_{RF}$. The second step down regulator is connected between $V_{in}$ and 1V8. The first step down regulator and the second step down regulator could each be an LT®8607 manufactured by Analog Devices®, which is headquartered in Norwood, Massachusetts. The low noise regulator could be an LT®3045 from Analog Devices®.

Also included is a third step down regulator (6-17V to 5V) that is connected between $V_{in}$ and $5V_{wi-fi}$. The third step down regulator can be disabled when USB powered due to insufficient power. The third step down regulator could be an LT®8607 from Analog Devices®, and in at least one embodiment is only activated if the UWB module is supplied via an external power supply.

As a general matter, the UWB module can be powered through an external supply voltage or USB, as examples. In some instances, in which USB is used as the power source, the onboard 5V regulation (i.e., the third step down regulator, used for an external Wi-fi module in some embodiments) is deactivated, as the current consumption would potentially exceed the USB specification. Thus, in at least some embodiments, use of a Wi-fi extension module or any other 5V-supplied extension board would warrant use of an external power supply.

The first portion 500A further includes a Micro USB element 504 that is connected to input voltage Vusb and to ground, and that is further connected to a data link 505. In an embodiment, Wi-fi functionality is not powered by USB, and USB only powers BLE and UWB circuits.

Figure 5B:
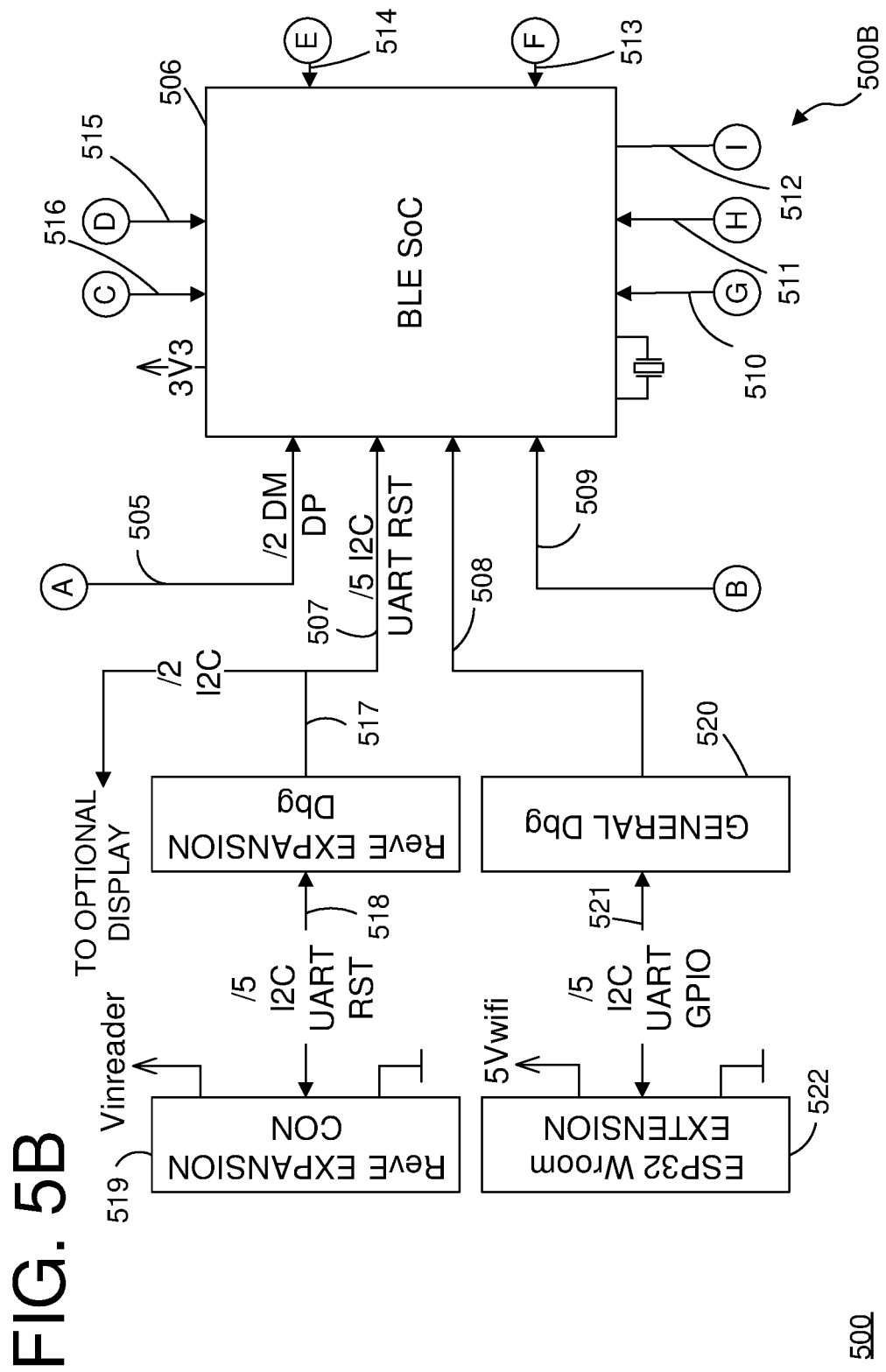

FIG. 5B depicts a second portion 500B of the example UWB-module architecture 500, in accordance with at least one embodiment. In the depicted embodiment, the second portion 500B includes a BLE system on chip (SoC) 506, a RevE expansion debug pinheader 517, a RevE expansion connector 519, a general debug pinheader 520, and an ESP32 WROOM extension connector 522. In an embodiment, RevE refers to a hardware revision of a reader such as an iCLASS SE reader manufactured by HID® Global Corporation, which is headquartered in Austin, Texas.

The ESP32 WROOM extension connector 522 could provide a connection option to an ESP32 module designed for Wi-fi connectivity, and could be configured to operate at up to a 500 mA current requirement at 5V, as an example. An ESP32 WROOM extension module could provide Wi-fi capability to a RevE reader, making that reader a transparent reader over Wi-fi, and could include an ESP32 WROOM module and an adapter board to a RevE extension connector (e.g., a Hirose connector). A programming adapter (e.g., VCOM via FTDI to Hirose connector) could make loading firmware easier. The Wi-fi module could be plugged into this programming adapter.

The BLE SoC 506 could be the NRF52840, manufactured by Nordic Semiconductor®, which is headquartered in Trondheim, Norway. In an embodiment, the BLE SoC 506 includes at least one onboard antenna. In at least one embodiment, the BLE SoC 506 is the core microcontroller for the UWB module having the example architecture 500. In some embodiments, both the reader and the UWB module (a.k.a. platform) use a Nordic NRF52840 as their respective core microcontroller. In embodiments of the UWB module of the present disclosure, a Nordic NRF52840 serves not only as the core controller of the UWB module, but also as the BLE interface used to set up secure UWB ranging sessions. An example pin/peripheral assignment for the NRF52840 for use as the BLE SoC 506 in at least one assignment is shown in Table 1 at the end of this detailed description.

The BLE SoC 506 is connected to both input voltage 3V3 and a 32 MHz crystal oscillator, and is also connected to the data link 505, as well as to a data link 507, a data link 508, a data link 509, a data link 510, a data link 511, a data link 512, a data link 513, a data link 514, a data link 515, and a data link 516. The data link 507 is connected to both an optional display and to the RevE expansion debug pinheader 517, which in turn is connected via a data link 518 to the RevE expansion connector 519. The UWB module can be powered via the RevE expansion connector 519 in embodiments in which the UWB module is used as an add-on module to a reader. In some instances, the UWB module is powered via a dedicated power connector. The data link 508 is connected to the general debug pinheader 520, which in turn is connected via a data link 521 to the ESP32 Wroom extension connector 522. The RevE expansion connector 519 is connected to both input voltage $V_{inreader}$ and to ground, whereas the ESP32 Wroom extension connector 522 is connected to both input voltage $5V_{wi-fi}$ and to ground.

FIG. 5C depicts a third portion 500C of the example UWB-module architecture 500, in accordance with at least one embodiment. In the depicted embodiment, the third portion 500C includes a mode selector 523, which could be or include a low profile DIP switch, and could be or include a double switch that allows developers to identify and/or define a number (e.g., 4) different operation modes of the UWB module having the example UWB-module architecture 500. The different operation modes could include a RevE extension mode, a standalone mode, a Wi-fi mode, and a debug mode, as examples. The mode selector 523 is connected to the data link 509. The mode selector 523 may allow a single firmware image to be developed for these and other multiple operation modes. In an embodiment, the mode selector 523 is a CVS-02 TB manufactured by NIDEC® Copal Electronics of Torrance, California.

In the depicted embodiment, the third portion 500C also includes a secure element 524, an embedded video engine 526, a backlight driver 530, and a display connector 528. As indicated by a board/printed circuit board (PCB) boundary 525, the secure element 524 could be or could reside on a PCB that is separate from a main board of the UWB-module architecture 500. The data link 510 is connected to both the secure element 524 and the embedded video engine 526. The secure element 524 could be or include a secure access module (SAM). In an embodiment, the secure element 524 is an ST33 ARM SC300 secure microcontroller manufactured by STMicroelectronics®, which is headquartered in Geneva, Switzerland.

The embedded video engine 526 could be an FT811 embedded video engine (EVE) manufactured by Future Technology Devices International® Limited, which is headquartered in Glasgow, Scotland in the United Kingdom. In at least one embodiment, the presence of the embedded video engine 526 on the board helps to unload the main microcontroller (i.e., the BLE SoC 506). The embedded video engine 526 could be wired to drive an external display in RGB mode, and to control the backlight driver 530. The embedded video engine 526 is connected to input voltage 3V3, and also by a data link 529 to the backlight driver 530 and by a data link 527 to the display controller 528. The backlight driver 530 is connected to the display controller 528 by a data link 531. In the depicted embodiment, the backlight driver 530 is the FAN5333, a dedicated LED controller that is manufactured by Fairchild Semiconductor®, a subsidiary of ON Semiconductor®, which is headquartered in Phoenix Arizona In an embodiment, the backlight driver 530 is used to control a display backlight. A shutdown pin of the backlight driver 530 is controlled in an embodiment by the embedded video engine 526 via a pulse width modulation (PWM), to allow for dimming.

The display connector 528 is further connected to input voltage 3V3, and with the BLE SoC 506 via a data link 532. The display connector 528 could be compatible with the Displaytech® DT024CTFT and DT024CTFT-TS displays, the latter of which supports touch control. These are examples of external thin-film-transistor (TFT) displays that the presently disclosed UWB-module architecture is designed to support, though other displays may be used instead. The display connector 528 could be a dedicated flat flex connector (FFC). In an embodiment, the supported display is 2.4" in size with 320×240 pixel resolution. A supported display could use an ILI9341 controller form ILI Technology® Corporation of Taiwan.

Figure 5D:
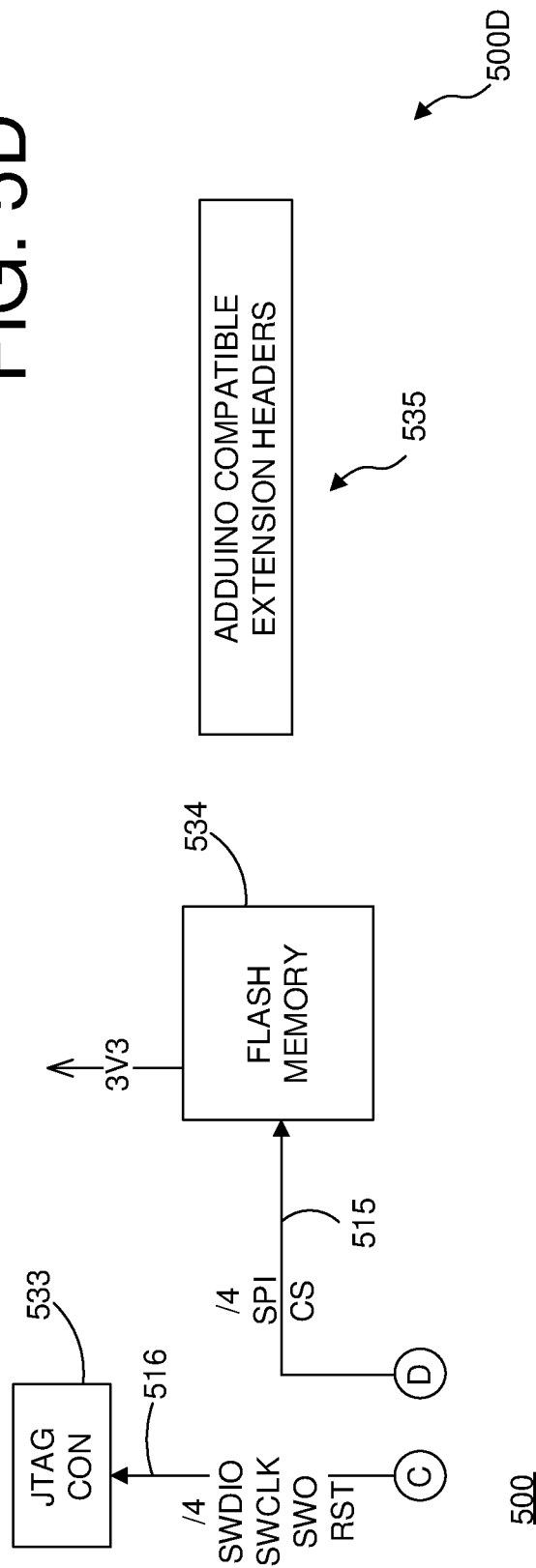

FIG. 5D depicts a fourth portion 500D of the example UWB-module architecture 500, in accordance with at least one embodiment. In the depicted embodiment, the fourth portion 500D includes a group of Arduino compatible extension headers 535, and also includes a Joint Test Action Group (JTAG) connector 533 that is connected to the data link 516, and a flash memory 534 that is connected to the data link 515 and also to input voltage 3V3. In an embodiment, the flash memory 534 could be an MX25L flash memory module manufactured by Macronix® International Co., Ltd. headquartered in Taiwan. In an embodiment, the particular part used is the MX25L1606EXCI-12G. The flash memory 534 could be used for storage of firmware images or other data. The capacity of the flash memory 534 could be 2 MB as an example. In an embodiment, a similar flash memory module is used in the reader to which the present UWB module is operably connected. The flash memory 534 and/or the flash memory module in the reader could be connected to a Queued Serial Peripheral Interface (QSPI) to enable flash access while still maintaining use of a general secure peripheral interface (SPI) interface.

The JTAG connector 533 could be the FTSH-105-01-F-DV-K, manufactured by Samtec®, Inc., headquartered in New Albany, Indiana. The JTAG connector 533 could be configured to operate in Serial Wire (SW) mode, which is an operating mode for the JTAG port where only two pins, TCLK and TMS, are used for the communication. A third pin can be use used optionally to trace data. JTAG pins and SW pins are shared. In an embodiment, with respect to the pins of the JTAG connector 533, TCLK is SWCLK (Serial Wire Clock), TMS is SWDIO (Serial Wire debug Data Input/Output), TDO is SWO (Serial Wire trace Output), and TDI is NC. Multiple JTAG connectors could be used on the board of the UWB module having the example architecture 500 that is described herein.

Figure 5E:
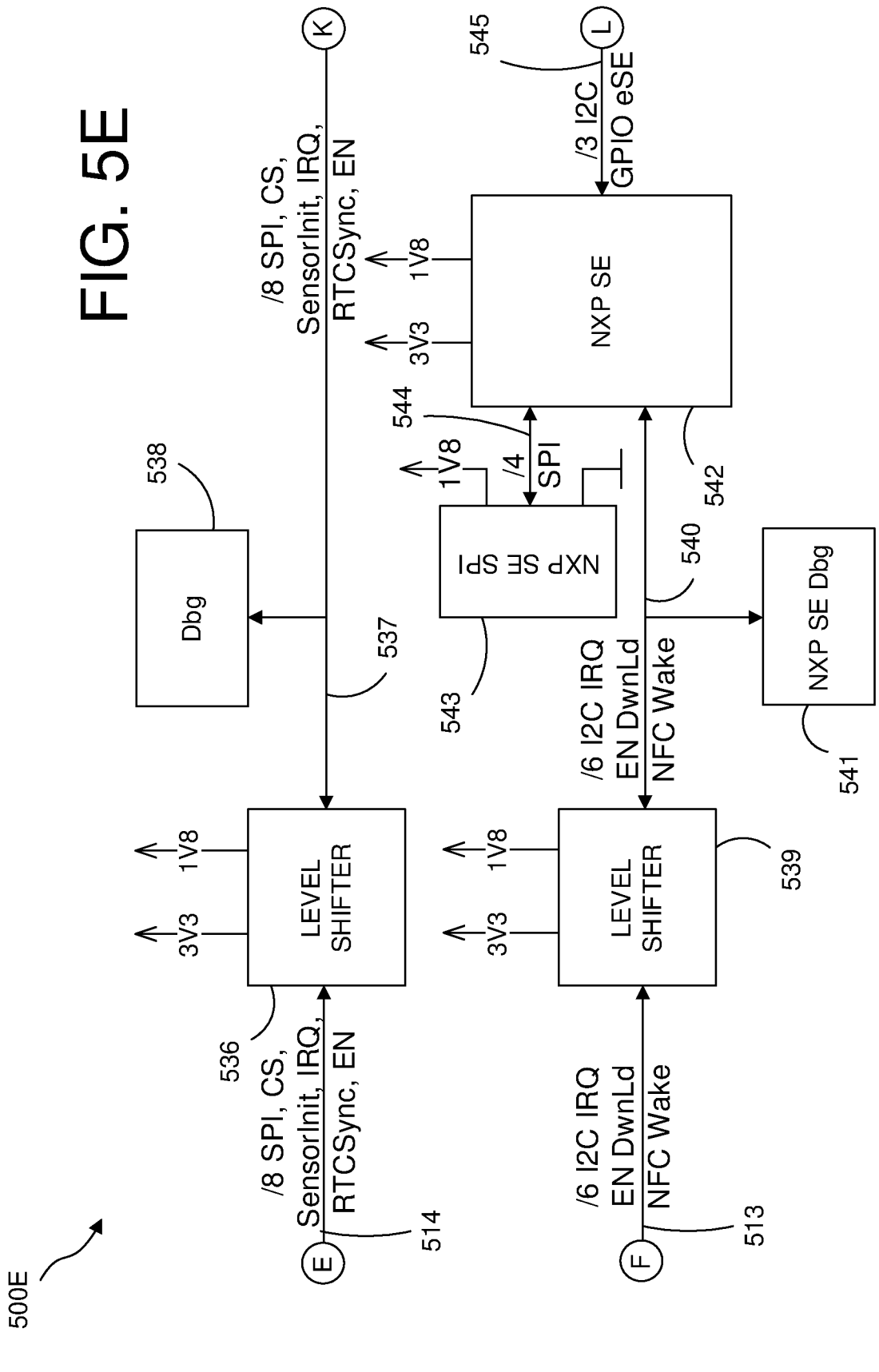

FIG. 5E depicts a fifth portion 500E of the example UWB-module architecture 500, in accordance with at least one embodiment. In the depicted embodiment, the fifth portion 500E includes a first level shifter 536, a second level shifter 539, a UWB integrated circuit chip debug pinheader 538, a secure element (SE) SPI pinheader 543, an SE debug pinheader 541, and an SE 542.

The first level shifter 536 could be a TXB0108 8-bit bidirectional voltage-level translator manufactured by Texas Instruments® Incorporated, which is headquartered in Dallas, Texas. The TXB0108 is used in at least one embodiment for general purpose I/O and SPI communication. In an embodiment, a core reset signal of the TXB0108 is used to control an output enable of the first level shifter 536. This allows for both the SE 542 and the below-described UWB IC 551 of FIG. 5F to be connected to an external circuit if the core reset line is pulled low, which can be done via the BLE SoC EX06 or via a pin header, as examples. The first level shifter 536 is connected to the data link 514 and to a data link 537, which is in turn connected to the debug connector 538. In an embodiment, the data link 537 includes an SPI bus that uses unified configuration interface (UCI) commands for unsecure ranging and UWB IC configuration.

The second level shifter 539 could include both a TXB0108 8-bit bidirectional voltage-level translator as well as a PCA9306DCUR bidirectional voltage-level translator also manufactured by Texas Instruments® Incorporated. The PCA9306DCUR is a dedicated 2-bit bidirectional I2C level shifter. In an embodiment, the PCA9306DCUR is used for the I2C interface to the SE 542. The second level shifter 539 is connected to the data link 513 and also to a data link 540, which is in turn connected to both the NXP SE debug connector 541 and the NXP secure element (SE) 542. In an embodiment, the NXP SE debug connector 541 is usable for external device connection to update an NXP applet (e.g., Secure Element Management Service (SEMS) agent).

Figure 5F:
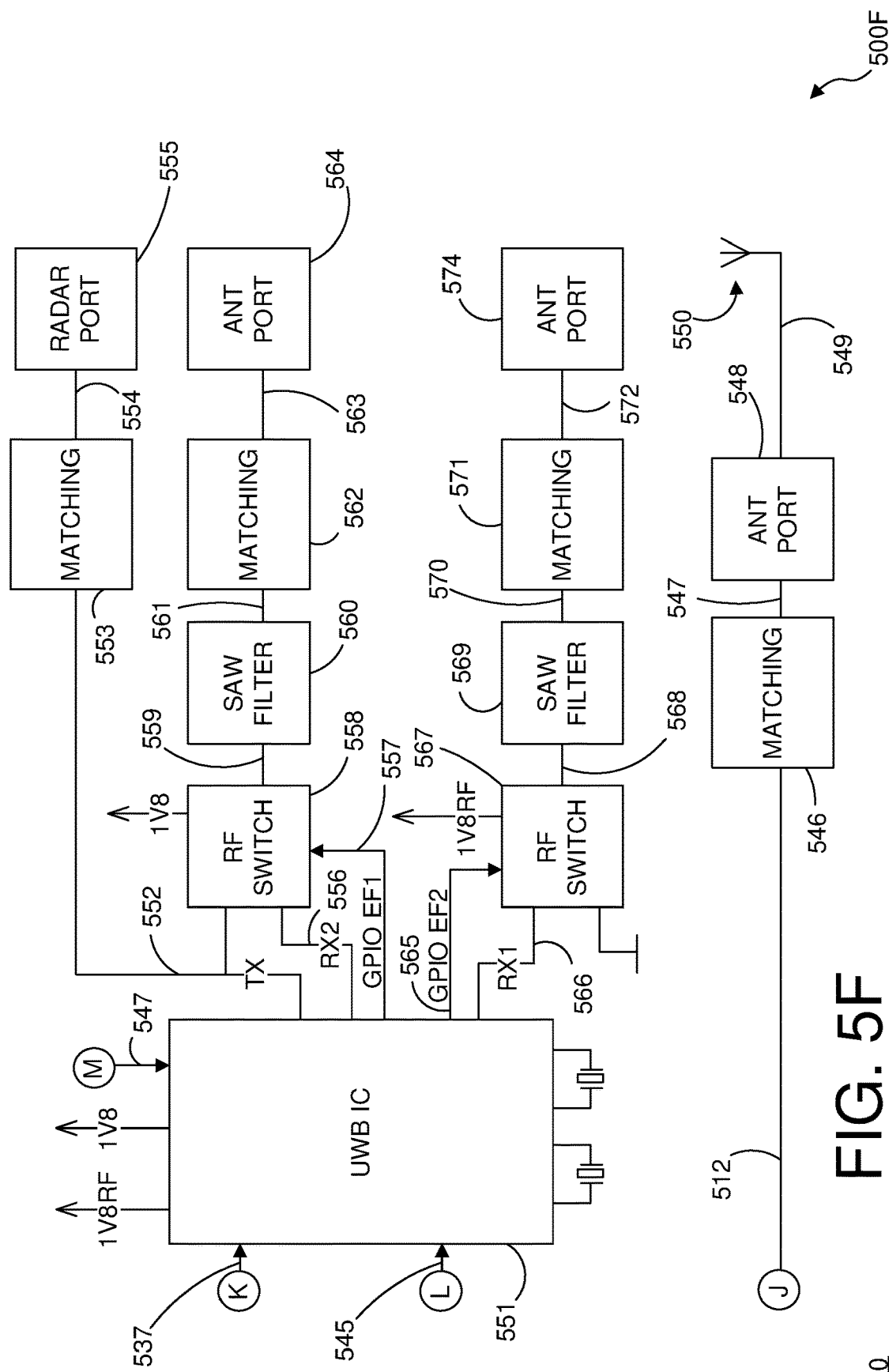

In an embodiment, the first level shifter 536 and the second level shifter 539 are used because the below-described UWB IC 551 of FIG. 5F is designed fora mobile device and as such has only limited supply voltage support, in particular only for 1.8V. Due to that, the interfaces to the UWB IC 551 in the present disclosure undergo voltage-level shifting. In an alternative approach, a host controller that operates at 1.8V could be used, or the I/O voltage of the host processor could be supplied with 1 8V. An advantage of the depicted architecture is that it makes it easier to interface with external devices. Also, the cross-switch capability of the BLE SoC 506 (in embodiments using the nRF52840) leads to flexible peripheral assignments on any of the external interfaces, making it less advantageous to use level shifters for those pins.

The SE 542 is connected via a data link 544 to the SE SPI pinheader 543, which itself is also connected to input voltage 1V8 and to ground. In addition to being connected to the SE SPI pinheader 543 via the data link 544 and to both the second level shifter 539 and the NXP SE debug connector 541 via the data link 540, the SE 542 is also connected to input voltage 3V3, input voltage 1V8, and a data link 545. In an embodiment, the SE 542 supports secure ranging. The SE 542 could be a Java Card SE with an NFC front end. In at least one embodiment, the SE 542 is the SN110U, which is a single chip secure element and NFC controller manufactured by NXP Semiconductors® N.V., which is headquartered in Eindhoven, Netherlands. In an embodiment, the NFC controller is designed for integration in mobile devices compliant with NFC Forum, EMVCo and ETSI/SWP.

FIG. 5F depicts a sixth portion 500F of the example UWB-module architecture 500, in accordance with at least one embodiment. In the depicted embodiment, the sixth portion 500F includes the above-mentioned UWB IC 551, as well as a first matching circuit 553, a radar port 555, a first RF switch 558, a first surface acoustic wave (SAW) bandpass filter 560, a second matching circuit 562, a first antenna port 564, a second RF switch 567, a second SAW bandpass filter 569, a third matching circuit 571, a second antenna port 574, a fourth matching circuit 546, a third antenna port 548, and a BLE antenna 550.

In at least one embodiment, the UWB 551 can be an SR100T, which is a secure fine ranging chipset that, like the SN110U that can be used as the SE 542, is manufactured by NXP Semiconductors® N.V. In an embodiment, the SR100T is a fully integrated single chip Impulse Radio Ultra-Wideband (IR-UWB) low-energy transceiver IC, compliant with IEEE 802.15.4 HRP UWB PHY. It is designed for secure ranging applications in a mobile environment. It supports super high frequency (SHF) UWB bands from 6.0 GHz to 8.5 GHz for worldwide use. It has a programmable transmitter output power of up to 12 dBm, as well as a fully coherent receiver for maximum range and accuracy. It integrates all relevant RF components (e.g., matching network, balun), and it complies with FCC & ETSI UWB spectral masks. It uses a supply voltage of 1.8V+/−7%.

The SR100T also supports angle of arrival (AoA) measurement, and has integrated I/Q phase and amplitude mismatch compensation. Its form factor is a 3.8 mm×3.1 mm 68-pin Wafer Level Chip Scale Package (WLCSP) package with 0.35 mm pitch. It includes an ARM® Cortex-M33 32 Bit processor having 128 kB code RAM, 128 kB data RAM, 64 kB ROM, and ARM® TrustZone technology and S-DMA for security. The SR100T further has a BSP32 CoolFlux SubSystem having a 200 MHz clock, 32 kB code RAM, and 2×16 kB data RAM. The SR100T also has a hardwired DSP for the first receive data link 566, the second received data link 556, and the transmission data link 552; operating frequencies of 250 MHz, 500 MHz, and 1000 MHz; 2×4 kB RAM for channel estimators, and 4×32 kB RAM for RF data log.

As depicted in FIG. 5F, the UWB 551 is connected to input voltage 1V8RF, input voltage 1V8, a first crystal oscillator (37.768 kHz), a second crystal oscillator (38.4 MHz), the data link 537, the data link 545, a data link 547, a transmission data link 552, a first receive data link 566, a second receive data link 556, a data link 557, and a data link 565.

The UWB IC 551 can be considered to be connected to two RF pipelines: a first RF pipeline and a second RF pipeline. The first RF pipeline includes the first RF switch 558, the first SAW bandpass filter 560, the second matching circuit 562, and the first antenna port 564. The second RF pipeline includes the second RF switch 567, the second SAW bandpass filter 569, the third matching circuit 571, and the second antenna port 574.

In the depicted embodiment, the UWB IC 551 is connected to the first matching circuit 553 via the transmission data link 552, which also connects the UWB IC 551 with the first RF switch 558. The first matching circuit 553 in turn is connected via a data link 554 to the radar port 555, which corresponds to a radar interface that can be used in connection with various embodiments. UWB can be used in radar operations, providing localization accuracies on the scale of tens of centimeters. Due to the possibly variable absorption and reflection of different frequencies in a pulse, both surface and obstructed (e.g., covered) features of an object can be detected. In some cases, the localization provides an angle of incidence in addition to distance.

As stated, in the first RF pipeline, the UWB IC 551 is connected via the transmission data link 552 to the first RF switch 558. The UWB IC 551 is also connected to the first RF switch 558 via the second receive data link 556 and the data link 557. The first RF switch 558, which is further connected to input voltage $1V8_{RF}$, could be an XMSSJR6G0BA, which is manufactured by Murata® Manufacturing Company, Ltd., which is headquartered in Kyoto, Japan. The first RF switch 558 is in turn connected via a data link 559 to the first SAW bandpass filter 560, which is in turn connected via a data link 561 to the second matching circuit 562. The second matching circuit 562 is in turn connected via a data link 563 to the first antenna port 563, which in at least one embodiment is in turn connected to a first external UWB antenna.

In the second RF pipeline, the UWB IC 551 is connected to the second RF switch 567 via the data link 565 and also via the first receive data link 566. The UWB IC 551 is also connected to input voltage 1V8RF and to ground. The second RF switch could also be an XMSSJR6G0BA. The second RF switch 567 is in turn connected via a data link 568 to the second SAW bandpass filter 569, which is in turn connected via a data link 570 to the third matching circuit 571. The third matching circuit 571 is in turn connected via a data link 572 to the second antenna port 574, which in at least one embodiment is in turn connected to a second external UWB antenna.

Any suitable number of external UWB antennas can be used in various different embodiments. In embodiments in which a third external UWB antenna is deployed in connection with the presently disclosed example architecture 500, a third RF pipeline is deployed to connect to the third externa UWB antenna. Moreover, a switch can be implemented to facilitate switching between antennas for different communication packets.

Further depicted in FIG. 5F is the fourth matching circuit 546 connected between the data link 512 and a data link 547, which further connects to the third antenna port 548. The third antenna port 548 provides optional connectivity to an external BLE antenna. In the depicted embodiment, the third antenna port 548 is connected via a data link 549 with the BLE antenna 550, which could be a 2.4 GHz BLE antenna.

In at least one embodiment, for its RF interfaces, the UWB module of the present disclosure utilizes U.FL connectors manufactured by Hirose® Electric Group, which is headquartered in Tokyo, Japan. These RF interfaces include the radar port 555 that can be connected to a radar antenna, the first antenna port 564 that can be connected to a first external UWB antenna, the second antenna port 574 that can be connected to a second external UWB antenna, and the third antenna port 548 that can be connected to the (external) BLE antenna 550. U.FL connectors are miniature RF coaxial connectors for high frequency signals, commonly used in applications where space is limited. They are often used in laptop mini PCI cards as well as mobile phones. Cables are manufactured by Hirose® can also be used. In some embodiments, Hirose X.FL connectors are used. Among other differences, X.FL connectors are rated for use at higher frequencies than are U.FL connectors.

FIG. 5G depicts a seventh portion of the example UWB-module architecture 500, in accordance with at least one embodiment. In the depicted embodiment, the seventh portion includes a channel impulse response (CIR) debug connector 575, which is connected to the data link 547. In some embodiments, the CIR debug connector 575 is used in connection with pins—of the above-described UWB IC 551 of FIG. 5F—that are used for SPI communication in order to access CIR data that the UWB IC 551 obtains. This CIR data can be used for analog debugging (e.g., analog performance debugging, null estimations, and/or the like) of ranging applications. The CIR is used to find the actual first path, i.e., the actual distance between two UWB devices (e.g., the UWB module 304 and the credential device 112). It is further noted that the maximum detectable delta between first path and strongest path is known as the dynamic range. As such, the actual first path represents an important debugging parameter in connection with ranging applications.

Figure 6:
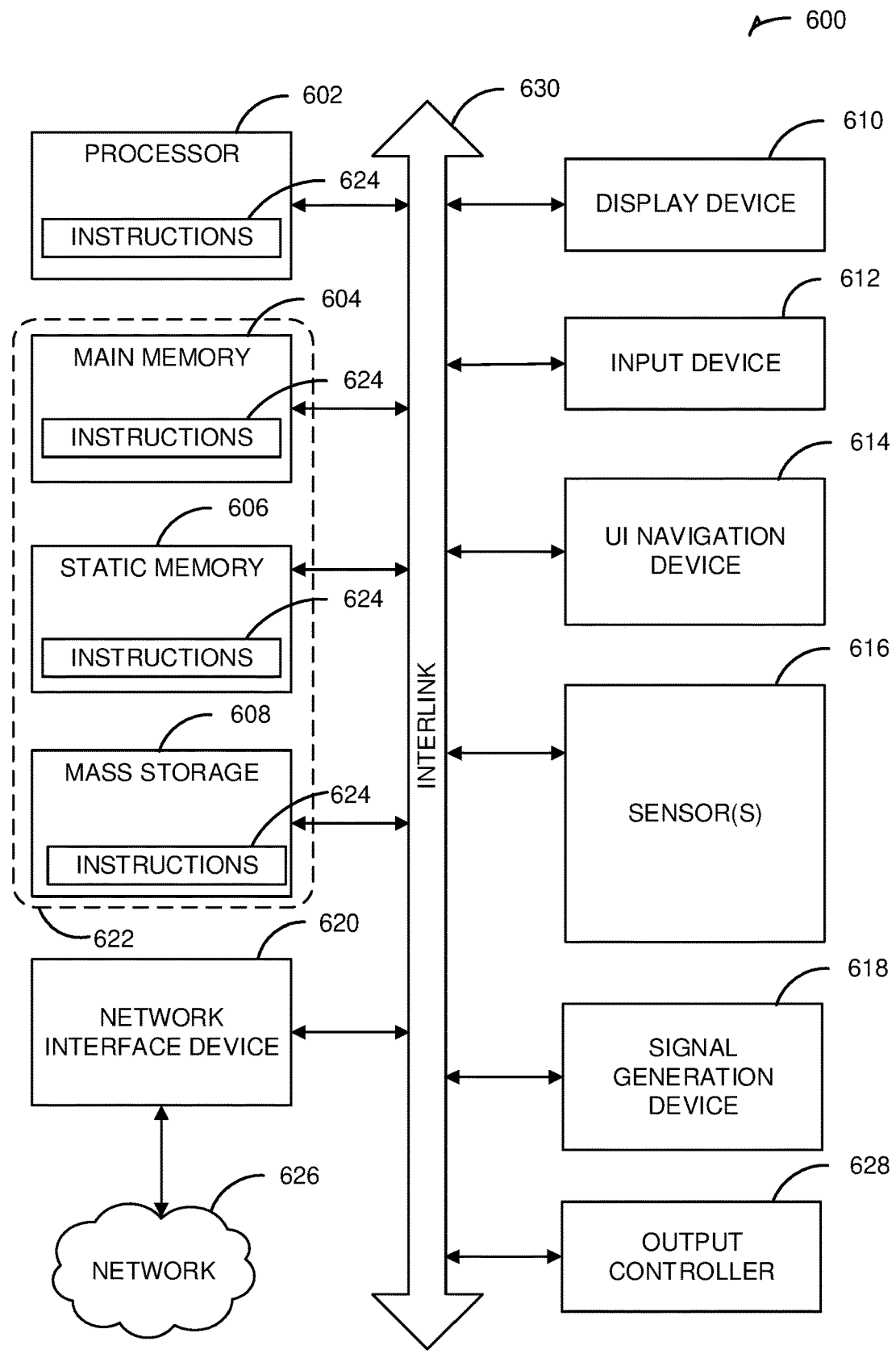
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein can perform. Examples, as described herein, can include, or can operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership can be flexible over time. Circuitries include members that can, alone or in combination, perform specified operations when operating. In some examples, hardware of the circuitry can be immutably designed to carry out a specific operation (e.g., hardwired). In some examples, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in some examples, the machine readable medium elements are part of the circuitry or are communicatively coupled to the other components of the circuitry when the device is operating. In some examples, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 600 follow.

In some embodiments, the machine 600 can operate as a standalone device or can be connected (e.g., networked) to other machines. In a networked deployment, the machine 600 can operate in the capacity of a server machine, a client machine, or both in server-client network environments. In some examples, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 can include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drives, tape drives, flash storage, or other block devices) some or all of which can communicate with each other via an interlink (e.g., bus) 630. The machine 600 can further include a display unit 610, an alphanumeric input device 612 (e.g., a keyboard), and a user interface (UI) navigation device 614 (e.g., a mouse). In some examples, the display unit 610, input device 612 and UI navigation device 614 can be a touch screen display. The machine 600 can additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 can be, or include, a machine readable medium 622 on which is stored one or more sets of data structures or instructions 624 (e.g., software) embodying or utilized by any one or more of the techniques or functions described herein. The instructions 624 can also reside, completely or at least partially, within any of registers of the processor 602, the main memory 604, the static memory 606, or the mass storage 608 during execution thereof by the machine 600. In some examples, one or any combination of the hardware processor 602, the main memory 604, the static memory 606, or the mass storage 608 can constitute the machine readable media 622. While the machine readable medium 622 is illustrated as a single medium, the term "machine readable medium" can include a single medium or multiple media (e.g., a centralized or distributed database, and/or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In some examples, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In some examples, information stored or otherwise provided on the machine readable medium 622 can be representative of the instructions 624, such as instructions 624 themselves or a format from which the instructions 624 can be derived. This format from which the instructions 624 can be derived can include source code, encoded instructions (e.g., in compressed or encrypted form), packaged instructions (e.g., split into multiple packages), or the like. The information representative of the instructions 624 in the machine readable medium 622 can be processed by processing circuitry into the instructions to implement any of the operations discussed herein. For example, deriving the instructions 624 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In some examples, the derivation of the instructions 624 can include assembly, compilation, or interpretation of the information (e.g., by the processing circuitry) to create the instructions 624 from some intermediate or preprocessed format provided by the machine readable medium 622. The information, when provided in multiple parts, can be combined, unpacked, and modified to create the instructions 624. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 624 can be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In some examples, the network interface device 620 can include one or more physical jacks (e.g., Ethernet, coaxial, or phone jacks) or one or more antennas to connect to the communications network 626. In some examples, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A device comprising:
   an antenna;
   a communication link configured to interface with a reader of an access control system;
   an ultra-wide band (UWB) front end circuit connected to the antenna to facilitate UWB communication with a credential device;
   a controller connected to the UWB front end circuit and configured to perform ranging for the credential device using the UWB communication upon receipt of data associated with the credential device from the reader over the communication link; and
   a device housing separate from a housing of the reader, the device housing containing the antenna, the UWB front end circuit, and the controller.

2. The device of claim 1, wherein the communication link is a wireless communication link.

3. The device of claim 2, wherein the controller is configured to communicate with the reader over the wireless communication link using Bluetooth Low Energy.

4. The device of claim 1, further comprising a battery contained in the device housing and configured to provide power for the controller and the UWB front end circuit.

5. The device of claim 1, further comprising a secure element contained in the device housing and configured to store a cached credential for the credential device.

6. The device of claim 1, further comprising an integrated circuit pluggable into a circuit board of the reader.

7. The device of claim 1, further comprising a second antenna contained in the device housing, wherein the UWB front end circuit is further connected to the second antenna to facilitate UWB communication.

8. The device of claim 1, further comprising an integrated circuit connectable into a circuit board of the reader.

9. An integrated circuit (IC) connectable to a circuit board, the integrated circuit comprising:
   an ultra-wide band (UWB) front end circuit connected to an antenna to facilitate UWB communication with a credential device;
   a communication link configured to interface with a reader of an access control system;
   a controller connected to the UWB front end circuit and configured to perform ranging for the credential device using the UWB communication upon receipt of data associated with the credential device from the reader over the communication link; and
   an IC housing separate from a housing of the reader of the access control system, the IC housing containing the antenna, the UWB front end circuit, and the controller.

10. The integrated circuit of claim 9, wherein the communication link is a wireless communication link.

11. The integrated circuit of claim 10, wherein the controller is configured to communicate with the reader over the wireless communication link using Bluetooth Low Energy.

12. The integrated circuit of claim 9, further comprising a battery contained in the IC housing and configured to provide power for the controller and the UWB front end circuit.

13. The integrated circuit of claim 9, further comprising a secure element contained in the IC housing and configured to store a cached credential for the credential device.

14. The integrated circuit of claim 9, further comprising a second antenna contained in the IC housing, wherein the UWB front end circuit is further connected to the second antenna to facilitate UWB communication.

15. An ultra-wide band (UWB) module comprising:
   an antenna;
   a communication link configured to interface with a reader of an access control system;
   an ultra-wide band (UWB) front end circuit connected to the antenna to facilitate UWB communication with a credential device;
   a controller connected to the UWB front end circuit and configured to perform ranging for the credential device using the UWB communication upon receipt of data associated with the credential device from the reader over the communication link; and
   a module housing separate from a housing of the reader, the module housing containing the antenna, the UWB front end circuit, and the controller.

16. The UWB module of claim 15, wherein the communication link is a wireless communication link.

17. The UWB module of claim 16, wherein the controller is configured to communicate with the reader over the wireless communication link using Bluetooth Low Energy.

18. The UWB module of claim 17, further comprising a battery contained in the module housing and configured to provide power for the controller and the UWB front end.

19. The UWB module of claim 18, further comprising a secure element contained in the module housing and configured to store a cached credential for the credential device.

20. The UWB module of claim 15, further comprising a second antenna contained in the module housing, wherein the UWB front end circuit is further connected to the second antenna to facilitate the UWB communication.

* * * * *